(12) United States Patent
Ishioka et al.

(10) Patent No.: US 8,433,539 B2
(45) Date of Patent: Apr. 30, 2013

(54) WIND TURBINE MONITORING DEVICE, METHOD, AND PROGRAM

(75) Inventors: Masahito Ishioka, Nagasaki (JP); Yasuyuki Kobayashi, Yokohama (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 441 days.

(21) Appl. No.: 12/672,338

(22) PCT Filed: Aug. 31, 2009

(86) PCT No.: PCT/JP2009/065174
§ 371 (c)(1),
(2), (4) Date: Feb. 5, 2010

(87) PCT Pub. No.: WO2011/024304
PCT Pub. Date: Mar. 3, 2011

(65) Prior Publication Data
US 2012/0130678 A1    May 24, 2012

(51) Int. Cl.
*G06F 17/18* (2006.01)
(52) U.S. Cl.
USPC .............. 702/179; 702/3; 702/176; 702/177; 702/178
(58) Field of Classification Search .................. 702/2, 3, 702/176–179, 181, 182; 703/2
See application file for complete search history.

(56) References Cited

U.S. PATENT DOCUMENTS

| | | | | |
|---|---|---|---|---|
| 2007/0299798 A1* | 12/2007 | Suyama et al. | ................ | 706/21 |
| 2010/0301606 A1* | 12/2010 | Hashimoto et al. | ............. | 290/44 |
| 2011/0049887 A1* | 3/2011 | Milo | ............................. | 290/44 |

FOREIGN PATENT DOCUMENTS

| JP | 59068643 A | 4/1984 |
|---|---|---|
| JP | 2001183114 A | 7/2001 |
| JP | 2002349413 A | 12/2002 |
| JP | 2002349415 A | 12/2002 |
| JP | 2003141306 A | 5/2003 |
| JP | 2003310564 A | 11/2003 |
| JP | 2004101417 A | 4/2004 |
| JP | 2004227279 A | 8/2004 |
| JP | 2005127757 A | 5/2005 |

(Continued)

OTHER PUBLICATIONS

International Search Report dated Nov. 17, 2009.
Genichi Taguchi, et al., "Engineering Development in MT System", 2002, pp. 38-45.

(Continued)

*Primary Examiner* — Sujoy Kundu
(74) *Attorney, Agent, or Firm* — Kanesaka Berner & Partners, LLP

(57) ABSTRACT

Status monitoring of a wind turbine is automatically performed, and evaluation of that status is quantitatively performed according to an appropriate criterion. Provided is a wind turbine monitoring device including a first storage unit in which a diagnostic data file is stored; a second storage unit in which a normal data file is stored; a diagnostics setting unit that that extracts and sets a plurality of datasets to be used in diagnosis from the first storage unit and that extracts and sets a plurality of datasets to be used in diagnosis from the second storage unit; an index-value calculating unit that calculates status index values representing the status of the wind turbine using a statistical calculation method, on the basis of the set datasets in the diagnostic data file and the datasets in the reference data file; a fault determining unit that evaluates the status of the wind turbine on the basis of the status index values; and a notification unit that notifies the result of this evaluation.

11 Claims, 16 Drawing Sheets

FOREIGN PATENT DOCUMENTS

| | | | |
|---|---|---|---|
| JP | 2005130649 | A1 | 5/2005 |
| JP | 2006077657 | A1 | 3/2006 |
| JP | 2006342766 | A | 12/2006 |

OTHER PUBLICATIONS

Masami Miyakawa, "Techniques for Acquiring Quality", 2000, pp. 224-227.

Masami Miyakawa et al., "On Countermeasures against Multicollinearity in Mahalanobis-Taguchi System", Journal of the Japanese Society for Quality Control, Oct. 2003; 33 (4), pp. 77-85.

Genichi Taguchi, "Strategy for Research and Development", 2005, pp. 10-11 and pp. 47-73.

Genichi Taguchi, "From Objective Function to Generic Function (5) - Quality Engineering for—Prediction, Taguchi-Schmidt Methods-", Apr. 2005; vol. 13, No. 2, pp. 6-10.

Genichi Taguchi, "Objective Function and Generic function (6)—Prediction by Taguchi Methods-" Quality Engineering, Jun. 2005, pp. 5-10.

Decision to Grant for JP2008-093738 mailed Apr. 17, 2012.

* cited by examiner

FIG. 5

| time | AZi1 | AZi2 | AZi3 | AZi4 | ... | PE74 | EA7 |
|---|---|---|---|---|---|---|---|
| 0:00:00 | 0.000037 | 0.000037 | 0.000037 | 0.0000 | | 0.001866 | 3.864547 |
| 0:01:00 | 0.000037 | 0.000037 | 0.000037 | 0.0000 | | 0.001537 | 1.688046 |
| 0:02:00 | 0.000037 | 0.000037 | 0.000037 | 0.0000 | | 0.001273 | 1.332104 |
| 0:03:00 | 0.000007 | 0.000008 | 0.000008 | 0.0000 | | 0.002361 | 4.88936 |
| 0:04:00 | 0.000004 | 0.000006 | 0.000009 | 0.0000 | | 0.002382 | 4.931479 |
| 0:05:00 | 0.001794 | 0.001794 | 0.001794 | 0.0017 | | 0.00236 | 4.887845 |
| 0:06:00 | 0.000012 | 0.000012 | 0.000012 | 0.0000 | | 0.001768 | 1.670544 |
| 0:07:00 | 0.000006 | 0.00001 | 0.000028 | 0.0000 | | 0.001508 | 1.559541 |
| 0:08:00 | 0.000037 | 0.000037 | 0.000037 | 0.000 | | 0.001641 | 1.132471 |
| 0:09:00 | 0.000065 | 0.000065 | 0.000065 | 0.000 | | 0.00163 | 1.578721 |
| 0:10:00 | 0.002168 | 0.002168 | 0.002168 | 0.00 | | 0.00126 | 2.179238 |
| 0:11:00 | 0.000009 | 0.000009 | 0.000009 | 0.00 | | 0.001336 | 2.799148 |
| 0:12:00 | 0.000029 | 0.000029 | 0.000029 | 0.0 | | 0.001642 | 1.889437 |
| 0:13:00 | 0.000012 | 0.000015 | 0.000015 | 0.0 | | 0.001362 | 2.214853 |
| 0:14:00 | 0.000013 | 0.000009 | 0.000009 | 0.0 | | 0.001392 | 1.879405 |
| 0:15:00 | 0.000037 | 0.000037 | 0.000037 | 0.0 | | 0.001122 | 1.796575 |
| 0:16:00 | 0.00001 | 0.000014 | 0.000031 | 0.00 | | 0.001493 | 3.116667 |
| 0:17:00 | 0.000054 | 0.000054 | 0.000054 | 0.00 | | 0.001376 | 1.944991 |
| 0:18:00 | 0.000037 | 0.000037 | 0.000037 | 0.00 | | 0.001272 | 1.749159 |

Columns AZi1–AZi4 belong to CH1; PE74 and EA7 belong to CH8.

FIG. 6

| time | ENVIRONMENT | | PERFORMANCE | | CHARACTERISTIC | | | | |
|---|---|---|---|---|---|---|---|---|---|
| | NORMALIZED WIND SPEED | MET WIND SPEED TURBULENCE | NET OUTPUT POWER | ROTATIONAL SPEED | CH1 | | | | |
| | X1 [m/s] | X2 [%] | X3 [kW] | X9 [rpm] | AZi1 | AZi2 | AZi3 | | EA7 |
| 0:00:00 | 14.4659 | 11.48075046 | 1870.78866 | 1146.29105 | 2.58861E-04 | 7.28E-05 | 8.52E-05 | | 27042143 |
| 0:01:00 | 14.2543 | 8.579650241 | 2425.43686 | 1139.73109 | 3.54904E-04 | 7.30E-05 | 4.92E-05 | | 13446731 |
| 0:02:00 | 12.576 | 9.771886848 | 2210.46584 | 1149.52251 | 2.95886E-04 | 7.07E-05 | 3.70E-05 | | 30348782 |
| 0:03:00 | 12.6408 | 9.389717499 | 2363.63351 | 1146.29105 | 3.92237E-04 | 7.02E-05 | 9.92E-05 | | 36736616 |
| 0:07:00 | 12.7621 | 10.43107536 | 2232.59732 | 1139.73109 | 3.02117E-04 | 8.49E-05 | -3.41E-05 | | 34225273 |
| 0:51:00 | 15.0501 | 9.129141763 | 2085.97521 | 1149.52251 | 3.28795E-04 | 6.53E-05 | 4.98E-05 | | 13076358 |
| 0:52:00 | 14.0164 | 9.960592927 | 1461.17443 | 1146.29105 | 1.57223E-04 | 5.82E-05 | 4.05E-05 | | 13650348 |
| 0:53:00 | 12.6329 | 13.40251466 | 1884.02984 | 1139.73109 | 2.57250E-04 | 6.54E-05 | 7.82E-05 | | 31214448 |
| 0:54:00 | 14.5128 | 12.35659887 | 2254.46053 | 1149.52251 | 3.98828E-04 | 7.25E-05 | 3.92E-05 | | 40194161 |
| 0:56:00 | 13.3415 | 16.14128569 | 2401.9736 | 1146.29105 | 3.11029E-04 | 7.62E-05 | 7.68E-05 | | 50839157 |
| 0:57:00 | 14.0098 | 10.0076284 | 2178.5491 | 1139.73109 | 3.05471E-04 | 7.16E-05 | 5.12E-05 | | 13526102 |
| 0:58:00 | 12.8965 | 10.97145987 | 2085.115 | 1149.52251 | 3.51738E-04 | 6.67E-05 | 5.39E-05 | | 132618174 |
| | | | | | | 7.17E-05 | 8.29E-0 | | |
| 23:27:00 | 16.2406 | 17.30884822 | 2410.314 | 1149.52251 | 3.30642E-04 | 9.27E-05 | 6.75E-0 | | 0.155248214 |
| 23:28:00 | 14.3654 | 17.71411794 | 2408.038 | 1146.29105 | 2.84329E-04 | 0.0001006 | 7.25E-0 | | 0.165459981 |
| 23:35:00 | 16.1882 | 10.39859262 | 2409.65 | 1139.73109 | 2.87104E-04 | 9.96E-05 | 0.000123 | | 0.167101623 |
| 23:36:00 | 15.4004 | 8.55588655 | 2408.97 | 1149.52251 | 2.67122E-04 | 0.000107735 | -1.20E- | | 0.167152646 |
| 23:38:00 | 12.8788 | 13.3191645 | 2292.69 | 1146.29105 | 1.77634E-04 | 8.15E-05 | 0.000111 | | 0.157382129 |
| 23:44:00 | 16.4504 | 13.54106849 | 2408.32 | 1139.73109 | 2.79921E-04 | 8.18E-05 | 0.000109 | | 0.161404007 |
| 23:45:00 | 15.2595 | 11.28574882 | 2411.41 | 1149.52251 | 3.00636E-04 | 9.24E-05 | 0.0001058 | | 0.161589851 |
| 23:47:00 | 15.0336 | 13.06551673 | 2409.1 | 1146.29105 | 2.21820E-04 | 9.48E-05 | 0.0001100 | | 0.163183985 |
| 23:48:00 | 16.972 | 17.03307556 | 2411.45 | 1139.73109 | 2.94847E-04 | 8.42E-05 | 9.87E- | | 0.1597871 |
| 23:50:00 | 16.483 | 11.41262743 | 2408.89 | 1149.52251 | 3.62641E-04 | 8.74E-05 | 9.14E-0 | | 0.162255304 |
| 23:52:00 | 13.6176 | 15.29443801 | 2408.232 | 1146.29105 | 3.03428E-04 | 0.00010004 | 6.29E-0 | | 0.156152729 |
| 23:59:00 | 13.2268 | 12.79685556 | 2406.413 | 1139.73109 | 3.38213E-04 | | | | 0.160355633 |

FIG. 13

| time | NORMALIZED WIND SPEED | MET WIND SPEED TURBULENCE | NET OUTPUT POWER | ROTATIONAL SPEED | CH1 | | | EA7 |
|---|---|---|---|---|---|---|---|---|
| | X1 [m/s] | X2 [%] | X3 [kW] | X9 [rpm] | AZi1 | AZi2 | AZi3 | |
| 0:00:00 | 14.4659 | 11.48075046 | 1870.788663 | 1146.29105 | 2.58861E-04 | 7.28E-05 | 8.52E-05 | 127042143 |
| 0:01:00 | 14.2543 | 8.579650241 | 2425.436865 | 1139.73109 | 3.54904E-04 | 7.30E-05 | 4.92E-05 | 0.13446731 |
| 0:02:00 | 12.576 | 9.771888848 | 2210.465844 | 1149.52251 | 2.95586E-04 | 7.07E-05 | 3.70E-05 | 130048782 |
| 0:03:00 | 12.6408 | 9.389711499 | 2388.633513 | 1146.29105 | 3.92237E-04 | 7.02E-05 | 9.92E-05 | 136736616 |
| 0:07:00 | 12.7621 | 10.43107536 | 2232.597329 | 1139.73109 | 3.02117E-04 | 8.49E-05 | -3.41E-05 | 134225273 |
| 0:51:00 | 15.0501 | 9.129141763 | 2085.975215 | 1149.52251 | 3.28795E-04 | 6.53E-05 | 4.98E-05 | 13076358 |
| 0:52:00 | 14.0164 | 9.960592927 | 1461.174436 | 1146.29105 | 1.57223E-04 | 5.82E-05 | 4.05E-05 | 113650348 |
| 0:53:00 | 12.6329 | 13.40251466 | 1884.029942 | 1139.73109 | 2.57250E-04 | 6.54E-05 | 7.82E-05 | 131214448 |
| 0:54:00 | 14.5128 | 12.35659887 | 2254.460533 | 1149.52251 | 3.98228E-04 | 7.25E-05 | 3.92E-05 | 140194161 |
| 0:56:00 | 13.3415 | 16.14128569 | 2401.97369 | 1146.29105 | 3.11029E-04 | 7.62E-05 | 7.68E-05 | 150839157 |
| 1:00:00 | 12.5073 | 17.73959902 | 2383.10213 | 1146.29105 | 3.89755E-04 | | 6.29E | 0.146462594 |
| 1:01:00 | 13.8632 | 13.20230721 | 2107.66780 | 1139.73109 | 2.44245E-04 | 6.32E-05 | 5.52E-05 | 0.137034451 |
| 23:27:00 | 16.2406 | 17.3084822 | 2410.3146 | 1149.52251 | 3.30642E-04 | 8.75E-05 | 5.21E-05 | 0.155248214 |
| 23:28:00 | 14.3654 | 17.7141794 | 2408.0385 | 1146.29105 | 2.84329E-04 | 9.27E-05 | 6.75E-05 | 0.165459881 |
| 23:35:00 | 16.1882 | 10.39859262 | 2409.6560 | 1139.73109 | 2.87104E-04 | 0.0001006 | 7.25E | 0.167101623 |
| 23:36:00 | 15.4004 | 8.55588655 | 2408.974 | 1149.52251 | 2.67122E-04 | 9.96E-05 | 0.0001 | 0.167152646 |
| 23:38:00 | 12.8788 | 13.3191645 | 2292.686 | 1146.29105 | 1.77634E-04 | 0.00010735 | -1.20 | 0.157382129 |
| 23:44:00 | 16.4504 | 13.54106849 | 2408.325 | 1139.73109 | 2.79921E-04 | 8.15E-05 | 0.00011 | 0.161404007 |
| 23:45:00 | 15.2595 | 11.28574882 | 2411.413 | 1149.52251 | 3.00636E-04 | 8.18E-05 | 0.000100 | 0.161589851 |
| 23:47:00 | 15.0336 | 13.06551673 | 2409.19 | 1146.29105 | 2.21820E-04 | 9.24E-05 | 0.000100 | 0.163183985 |
| 23:48:00 | 16.972 | 17.03307556 | 2411.4562 | 1139.73109 | 2.94847E-04 | 9.48E-05 | 0.000110 | 0.1597871 |
| 23:50:00 | 16.483 | 11.41262743 | 2408.8911 | 1149.52251 | 3.62641E-04 | 8.42E-05 | 9.87E | 0.16225304 |
| 23:52:00 | 13.6176 | 15.29443801 | 2408.2329 | 1146.29105 | 3.03428E-04 | 8.74E-05 | 9.14E | 0.156152729 |
| 23:59:00 | 13.2268 | 12.79685556 | 2406.4138 | 1139.73109 | 3.38213E-04 | 0.00010004 | 6.29E | 0.160355633 |

FIG. 17

| TEST NO. | TEST CONDITIONS | | | | |
|---|---|---|---|---|---|
| | ATTRIBUTE 1 | ATTRIBUTE 2 | ATTRIBUTE 3 | ATTRIBUTE 4 | ATTRIBUTE 5 |
| 1 | ○ | ○ | ○ | ○ | ○ |
| 2 | ○ | ○ | ○ | ○ | ○ |
| 3 | ○ | ○ | × | × | × |
| 4 | ○ | × | ○ | × | × |
| 5 | ○ | × | × | ○ | × |
| 6 | × | × | × | × | ○ |
| 7 | × | ○ | × | × | ○ |
| 8 | × | ○ | ○ | ○ | × |
| 9 | × | ○ | × | × | × |
| 10 | × | × | ○ | ○ | ○ |
| 11 | × | × | ○ | × | ○ |
| 12 | × | × | ○ | ○ | × |

FIG. 18

| TEST NO. | TEST CONDITIONS | | | | | MD VALUE | | S/N RATIO (dB) |
|---|---|---|---|---|---|---|---|---|
| | ATTRIBUTE 1 | ATTRIBUTE 2 | ATTRIBUTE 3 | ATTRIBUTE 4 | ATTRIBUTE 5 | $D^2(1)$ | $D^2(2)$ | $\eta$ |
| 1 | ○ | ○ | ○ | ○ | ○ | 10.23 | 11.01 | $\eta_1$ |
| 2 | ○ | ○ | ○ | ○ | ○ | 9.63 | 8.00 | $\eta_2$ |
| 3 | ○ | ○ | × | × | × | | | |
| 4 | ○ | × | ○ | × | × | | | |
| 5 | ○ | × | × | ○ | × | | | |
| 6 | × | ○ | × | × | ○ | | | |
| 7 | × | ○ | × | ○ | ○ | | | |
| 8 | × | ○ | ○ | × | × | | | |
| 9 | × | × | × | ○ | × | | | |
| 10 | × | × | ○ | × | ○ | | | |
| 11 | × | × | ○ | × | ○ | 13.20 | 9.99 | $\eta_{11}$ |
| 12 | × | × | ○ | ○ | × | 4.32 | 6.90 | $\eta_{12}$ |

WIND TURBINE MONITORING DEVICE, METHOD, AND PROGRAM

TECHNICAL FIELD

The present invention relates to a wind turbine monitoring device, method, and program which are suitable for application to a wind turbine that converts wind power energy to electrical power.

BACKGROUND ART

In generally known wind turbine monitoring technology in the related art, the operating status (normal, requiring attention, breakdown, etc.) is monitored by, for example, automatically acquiring measurement data according to the operating conditions from sensors attached to individual locations on the wind turbine, and by comparing the measurement data associated with each measured item with respective pre-registered threshold values.

RELATED-ART CITATIONS

Patent Citations

Patent Citation 1: Japanese Unexamined Patent Application, Publication No. 2006-342766

DISCLOSURE OF INVENTION

Problems to be Solved by the Invention

It is extremely difficult, even for experts, to determine whether or not the status levels associated with each measurement item obtained from the measurement data measured by the individual sensors indicate a fault, and high-precision determination results cannot be expected with a method such as that for determining a fault by comparing the measurement data with preregistered threshold values, like that described above.

Also, when there are correlations of multiple combinations between multiple measurement items, it is preferable to determine the operating status by taking these correlations into account; with this kind of complex processing, however, automatic determination is difficult.

One way that has been considered to improve the diagnosis precision is to perform diagnostic determination using experts; however, processing of a large amount of measurement data is undesirable in view of the effort and time required. In addition, in the case of diagnosis by experts, the precision and reproducibility of fault detection and factorial analysis during operation depend on the knowledge and level of skill of the individual experts. Therefore, there is a problem in that large variations occur in the diagnostic level of fault detection and factorial analysis in wind turbine equipment.

The present invention has been conceived to solve the problems described above and provides a wind turbine monitoring device, method, and program that can perform automatic monitoring of the wind turbine status and that can perform quantitative evaluation of that status based on an appropriate criterion.

Means for Solving the Problems

In order to solve the problems described above, the present invention employs the following solutions.

A first aspect of the present invention is a wind turbine monitoring device for monitoring the status of a wind turbine using attribute values created on the basis of measurement data measured by a plurality of sensors provided on the wind turbine, the wind turbine monitoring device including a first storage unit in which a plurality of attribute values that are associated with a measurement timestamp are stored by attribute type, and in which, when the attribute values associated with the same measurement timestamp serve as a single dataset, identifying information indicating a class category that is set according to attribute values of prescribed attributes is assigned to the dataset and stored; a second storage unit in which a plurality of attribute values that are associated with a measurement timestamp are stored by attribute type, and in which, when the attribute values associated with the same measurement timestamp serve as a single dataset, identifying information that indicates a class category that is set according to the attribute values of prescribed attributes is assigned to the dataset, and the attribute values of the specific attributes forming the dataset belong to a prescribed standard range that is defined in advance; a diagnostics setting unit that extracts and sets a plurality of the datasets to be used in diagnosis from the first storage unit and that extracts and sets a plurality of the datasets to be used in the diagnosis from the second storage unit; an index-value calculating unit that calculates status index values representing the status of the wind turbine using a statistical calculation method, based on the datasets in the diagnostic data file and the datasets in the reference data file, set by the diagnostics setting unit; an evaluation unit that evaluates the status of the wind turbine on the basis of the status index values calculated by the index-value calculating unit; and a notification unit that notifies a result of the evaluation by the evaluation unit.

Because the status index values representing the status of the wind turbine are calculated in this way using the diagnostic data file and the reference data file, it is possible to realize quantitative evaluation instead of qualitative evaluation based on experience and knowledge. In addition, because the above-described status index values are values in which the class category assigned to each dataset is taken into account, it is possible to compare datasets acquired under the same conditions. Thus, it is possible to more accurately evaluate the status of the wind turbine.

In the above-described wind turbine monitoring device according to the first aspect of the present invention, the attributes may be broadly divided into three categories, which are an environment category related to the environment surrounding the wind turbine, a performance category related to the performance and power generating conditions of the wind turbine operation, and a characteristics category related to diagnosis of the operating status associated with various monitoring sites set on the wind turbine.

In the above-described wind turbine monitoring device according to the first aspect of the present invention, the class categories may be set according to the attribute values of prescribed attributes categorized into at least one of the environment category and the performance category.

Because the class category is set on the basis of the environment category and the performance category in this way, it is possible to categorize the datasets according to the environmental conditions and the power generating status when the attribute values categorized in the characteristic category are acquired.

In the above-described wind turbine monitoring device according to the first aspect of the present invention, the plurality of datasets stored in the second storage unit may be those in which only the datasets in which the attribute values associated with the specific attributes fall within the standard range set in advance are extracted from among the plurality of datasets created from the plurality of measurement data items collected from the wind turbine.

Because the reference data file is created based on the measurement data measured in the same wind turbine, it is possible to evaluate the status of the wind turbine using the reference data file in which the individual characteristics etc. are reflected. Therefore, it is possible to more accurately determine the status of the wind turbine.

In the above-described wind turbine monitoring device according to the first aspect of the present invention, the standard range may be set according to class category.

By doing so, it is possible to create the reference data file using a suitable standard range which is set by class category.

In the above-described wind turbine monitoring device according to the first aspect of the present invention, the index-value calculating unit may calculate the status index value by obtaining a characteristic distribution of the reference data and obtaining a characteristic distribution of the diagnostic data, which are set by the diagnostics setting unit, and by qualitatively obtaining the distance by which the characteristic distributions deviate from each other.

Because the characteristic distributions are obtained in this way and the distance by which these distributions deviate from each other is quantitatively obtained, it is possible to quantitatively evaluate to what relative degree the diagnostic data deviates from the characteristic distribution of the reference data.

In the above-described wind turbine monitoring device according to the first aspect of the present invention, the status index values calculated by the index-value calculating unit are, for example, Mahalanobis distances calculated using the Mahalanobis-Taguchi method.

In the above-described wind turbine monitoring device according to the first aspect of the present invention, a factorial analysis unit may be provided that, when it is evaluated by the evaluation unit that a fault occurs, performs factorial analysis of that fault.

By performing factorial analysis in this way, it is possible to quickly ascertain which location is determined as being the source of the fault. Thus, measures can be quickly taken.

A second aspect of the present invention is a wind-turbine-group monitoring system for monitoring the status of part or the entirety of a wind farm equipped with a plurality of wind turbines, including one of the wind turbine monitoring devices described above, wherein the status of part or the entirety of the wind farm is monitored on the basis of a status index value of each of the wind turbines, obtained by the wind turbine monitoring device, and the operating performance of part or the entirety of the wind farm.

With this configuration, a portion (segment) constituting the wind farm, or the entirety thereof, can be relatively evaluated, and it is thus possible to identify a wind turbine showing a characteristic that differs compared with the other wind turbines. Thus, by evaluating the status from wind turbine to wind turbines, it is possible to perform status monitoring of each wind turbine using more appropriate criteria.

A third aspect of the present invention is a wind turbine monitoring method which monitors the status of a wind turbine using attribute values created on the basis of measurement data measured by a plurality of sensors provided on the wind turbine, the wind turbine monitoring method including a step of creating a diagnostic data file in which a plurality of attribute values associated with a measurement timestamp are stored by attribute type; an assigning step in which, when the attribute values associated with the same measurement timestamp in the diagnostic data file serve as a single dataset, the dataset is assigned identifying information indicating a class category that is set according to the attribute values of prescribed attributes; a step of creating a reference data file in which attribute values related to specific attributes belong to a prescribed standard range that is defined in advance, and in which the attribute value of each attribute is associated with the measurement timestamp; an assigning step in which, when the attribute values associated with the same measurement timestamp serve as a single dataset, the dataset is assigned identifying information indicating a class category that is set according to attribute values of prescribed attributes; a step of extracting and setting a plurality of the datasets to be used in diagnosis from the diagnostic data file, and of extracting and setting a plurality of the datasets to be used in the diagnosis from the reference data file; a step of calculating status index values representing the status of the wind turbine using a statistical calculation method, based on the set datasets in the diagnostic data file and the datasets in the reference data file; a step of evaluating the status of the wind turbine on the basis of the status index values; and a step of notifying the result of the evaluation.

A fourth aspect of the present invention is a wind turbine monitoring program which monitors the status of a wind turbine using attribute values created on the basis of measurement data measured by a plurality of sensors provided on the wind turbine, the wind turbine monitoring program causing a computer to execute processing for creating a diagnostic data file in which a plurality of attribute values associated with a measurement timestamp are stored by attribute type; assigning processing in which, when the attribute values associated with the same measurement timestamp in the diagnostic data file serve as a single dataset, the dataset is assigned identifying information indicating a class category that is set according to the attribute values of prescribed attributes; processing for creating a reference data file in which attribute values related to specific attributes belong to a prescribed standard range that is defined in advance, and in which the attribute value of each attribute is associated with the measurement timestamp; assigning processing in which, when the attribute values associated with the same measurement timestamp serve as a single dataset, the dataset is assigned identifying information indicating a class category that is set according to attribute values of prescribed attributes; processing for extracting and setting a plurality of the datasets to be used in diagnosis from the diagnostic data file, and for extracting and setting a plurality of the datasets to be used in the diagnosis from the reference data file; processing for calculating status index values representing the status of the wind turbine using a statistical calculation method, based on the set datasets in the diagnostic data file and the datasets in the reference data file; processing for evaluating the status of the wind turbine on the basis of the status index values; and processing for notifying the result of the evaluation.

Effects of the Invention

According to the present invention, an advantage is afforded in that it is possible to perform status monitoring of the wind turbine automatically, and it is possible to quantitatively perform evaluation of the status thereof on the basis of an appropriate criterion.

BRIEF DESCRIPTION OF DRAWINGS

FIG. 5 is a diagram showing an example of a new data file in which diagnostic physical quantities are stored in correspondence with channels and natural frequencies.

FIG. 6 is a diagram showing an example of a diagnostic data file.

FIG. 13 is an explanatory diagram for explaining individual datasets used in processing for calculating a Mahalanobis distance.

FIG. 17 is a diagram showing an example of a two-level orthogonal array used in the third embodiment of the present invention.

FIG. 18 is a diagram in which an MD value and an S/N ratio gain are appended to the two-level orthogonal array shown in FIG. 17.

BEST MODE FOR CARRYING OUT THE INVENTION

Embodiments of a wind turbine monitoring device, method, and program according to the present invention will be described below with reference to the drawings.

First Embodiment

Figure 1:
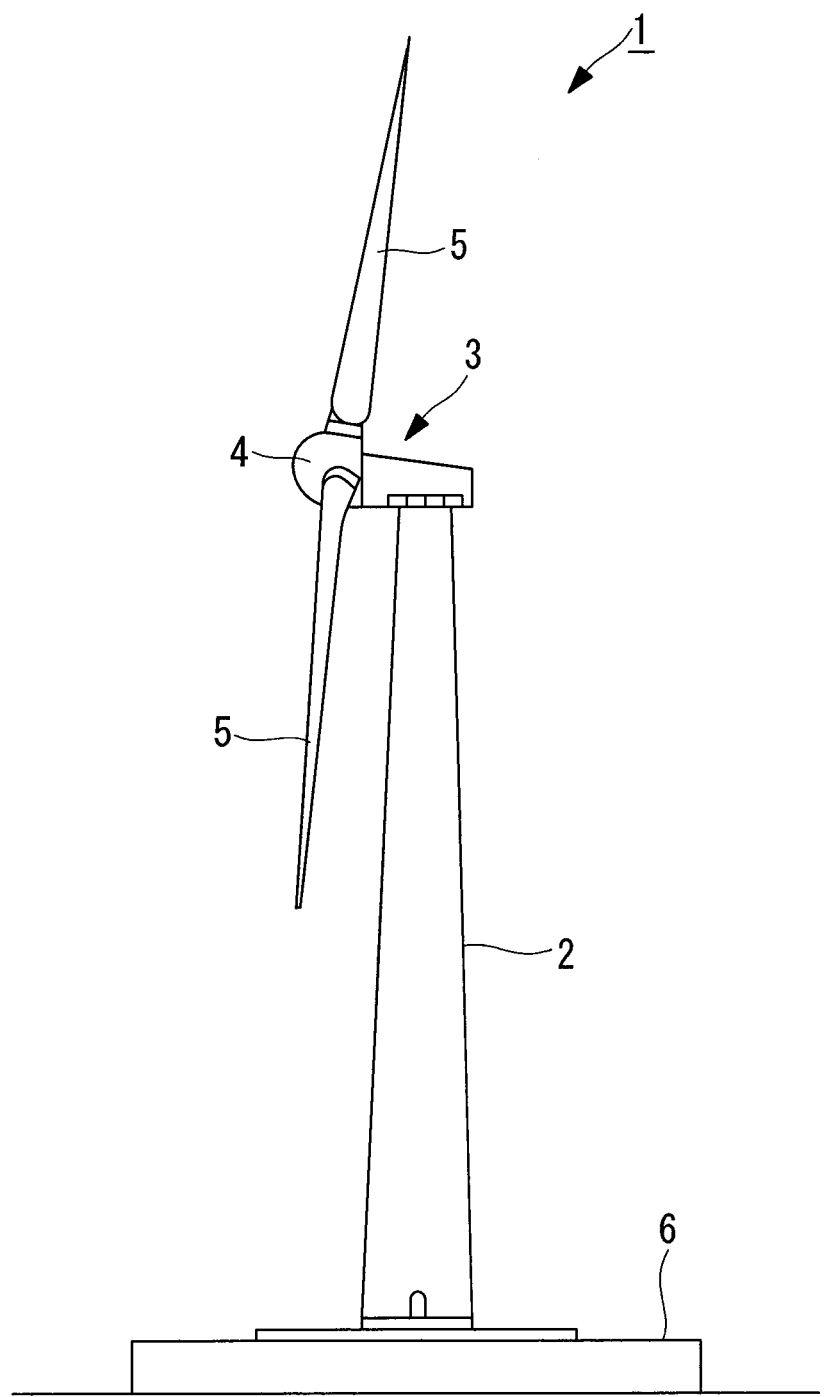
FIG. 1 is a diagram showing, in outline, the overall configuration of a wind turbine.

FIG. 1 is a diagram showing, in outline, the configuration of a wind turbine. As shown in FIG. 1, a wind turbine 1 includes a tower 2 erected upright on a base 6, a nacelle 3 provided at the top of the tower 2, and a rotor head 4 provided on the nacelle 3 so as to be rotatable about a substantially horizontal axis. A plurality of wind turbine blades 5 are attached to the rotor head 4 in a radiating pattern around a rotational axis thereof. Accordingly, the force of wind striking the wind turbine blades 5 from the rotational axis direction of the rotor head 4 is converted to motive energy that causes the rotor head 4 to rotate about its rotational axis, and this motive force is converted to electrical energy by a generator.

Figure 2:
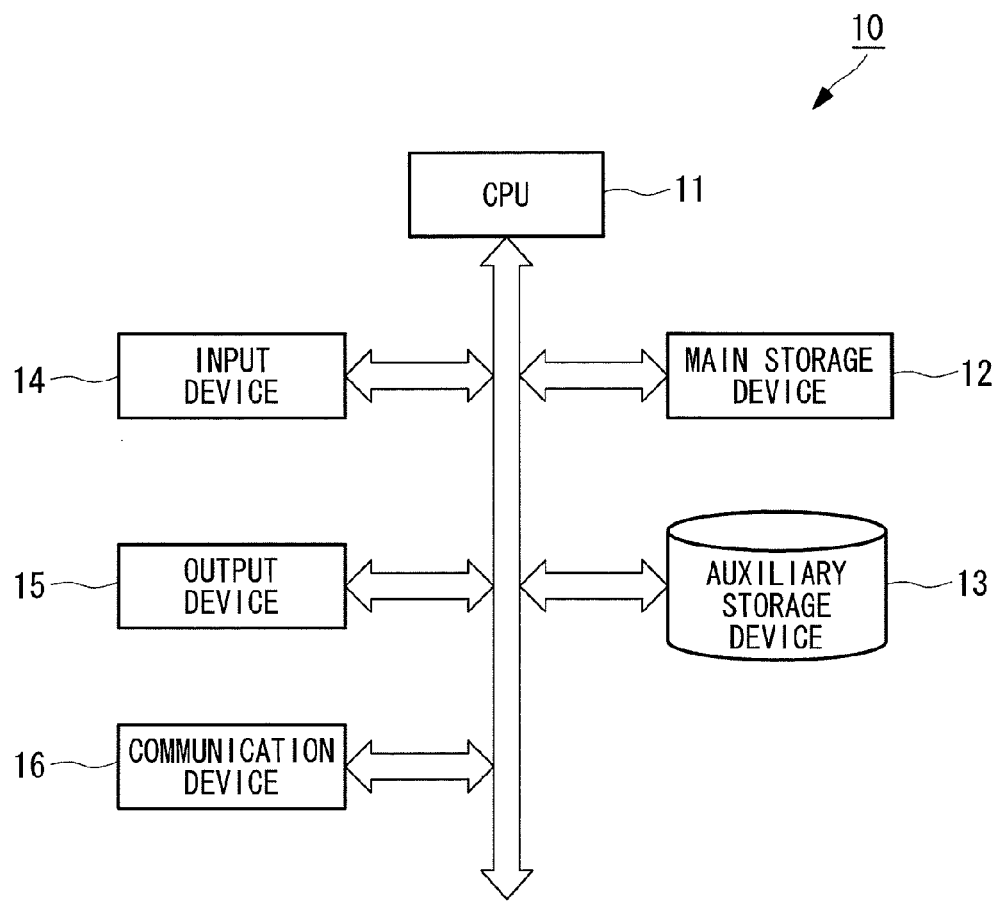
FIG. 2 is a diagram showing, in outline, the configuration of a monitoring device according to a first embodiment of the present invention.

FIG. 2 is a block diagram showing, in outline, the configuration of a wind turbine monitoring device (hereinafter, "monitoring device") according to this embodiment. The monitoring device according to this embodiment shown in FIG. 2 may be installed either internally or externally with respect to the wind turbine structure. As shown in FIG. 2, a monitoring device 10 is a computer system (calculating system) formed of a CPU (central processing unit) 11, a main storage device 12 such as a RAM (Random Access Memory), an auxiliary storage device 13 such as a ROM (Read Only Memory) or an HDD (Hard Disk Drive), an input device 14 such as a keyboard or mouse, an output device 15 such as a monitor or printer, and a communication device for sending and receiving information by performing communication with an external device.

Various programs (for example, a monitoring program) are stored in the auxiliary storage device 13, and the CPU 11 realizes various kinds of processing by reading out the programs from the auxiliary storage device 13 into the main storage device 12 and executing them.

Figure 3:
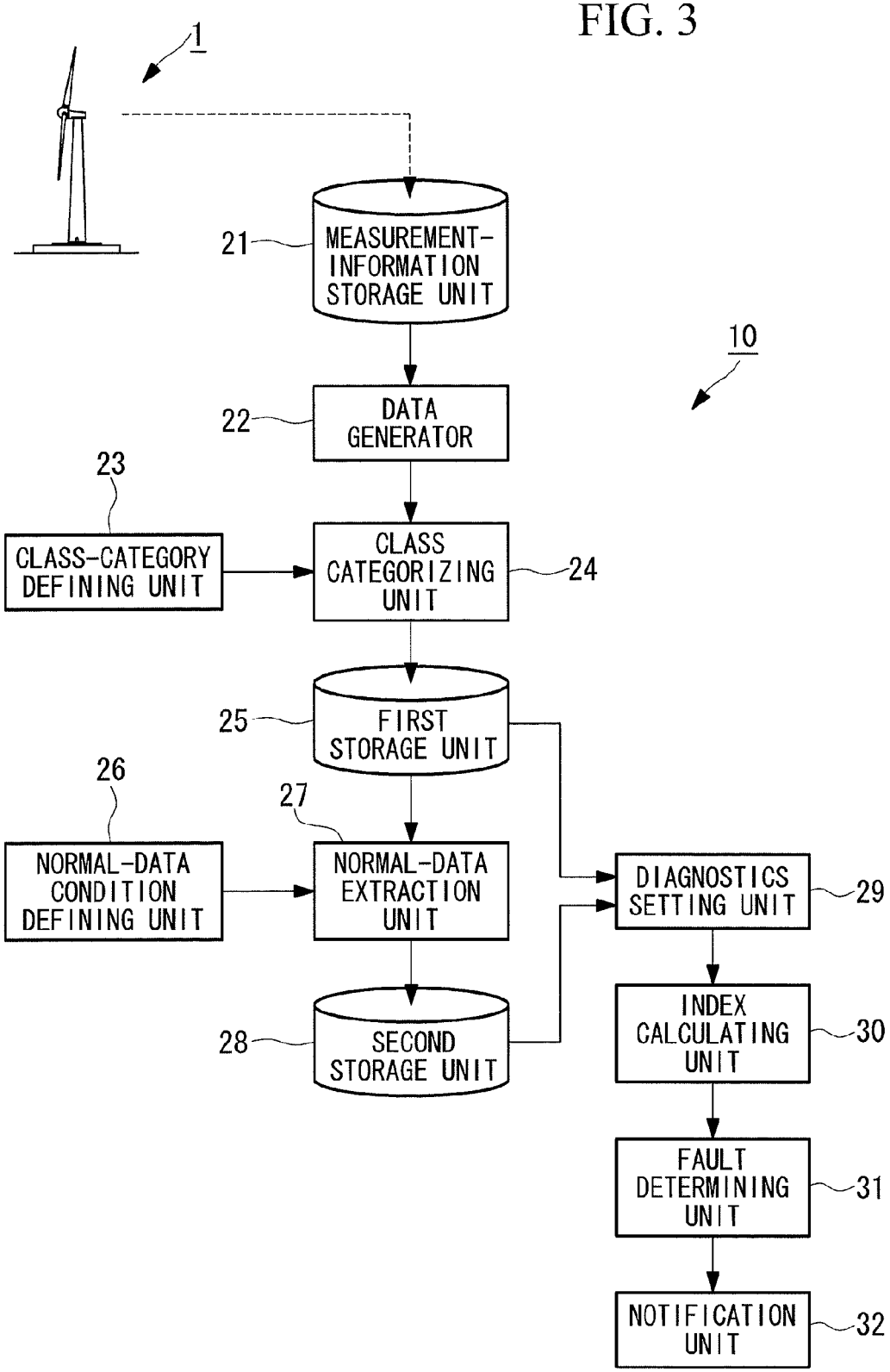
FIG. 3 is a functional block diagram showing, in an expanded fashion, the functions of the monitoring device according to the first embodiment of the present invention.

FIG. 3 is a functional block diagram showing, in an expanded fashion, the functions provided in the monitoring device 10. As shown in FIG. 3, the monitoring device 10 is provided with a measurement-information storage unit 21, a data generator 22, a class-category defining unit 23, a class categorizing unit 24, a first storage unit 25, a normal-data condition defining unit 26, a normal-data extraction unit 27, a second storage unit 28, a diagnostics setting unit 29, an index-value calculating unit 30, a fault determining unit 31, and a notification unit 32.

A plurality of data files formed from a plurality of measured data values from each sensor are stored in the measurement-information storage unit 21.

A measurement timestamp at which that measurement data value was measured is associated with each measurement data value in each data file. This measurement timestamp functions as a linking parameter that links together various measurement data items among the data files in diagnostic data creation processing performed in the class categorizing unit 24, described later.

The data generator 22 executes mainly the two kinds of processing shown below.

Sampling-Time Standardizing Processing

The time intervals (hereinafter, "sampling times") of the measurement timestamps of each measurement data value in various data files stored in the measurement-information storage unit 21 are not standardized. Therefore, the data generator 22 first performs processing for standardizing these sampling times. In this embodiment, each data file is rebuilt into one-minute interval measurement data.

For example, if the sampling time is sufficiently faster than one minute, a representative value for 1 minute is selected based on a statistical method, using all of the measurement data acquired in one minute. For example, the representative value is expressed by the mean and standard deviation.

By doing so, it is possible to synchronously associate the measurement data in all data files with a common time interval.

Calculation of Diagnostic Physical Quantity

Next, the data generator extracts a "diagnostic physical quantity" for a prescribed data file from among the various data files whose measurement timestamps are standardized.

In other words, as described above, the raw data measured by the various sensors is stored in the measurement-information storage unit 21, but in order to diagnose the operating status etc. of each part being monitored, it is necessary to generate a diagnostic physical quantity that is suitable for diagnosis and extract it from this raw data.

For example, to monitor the operating status of a bearing/gearbox, eight acceleration sensors are mounted at individual measurement locations. The time-series waveform which is the measurement data measured by each sensor is stored, by sensor, in the measurement-information storage unit 21.

Figure 4:
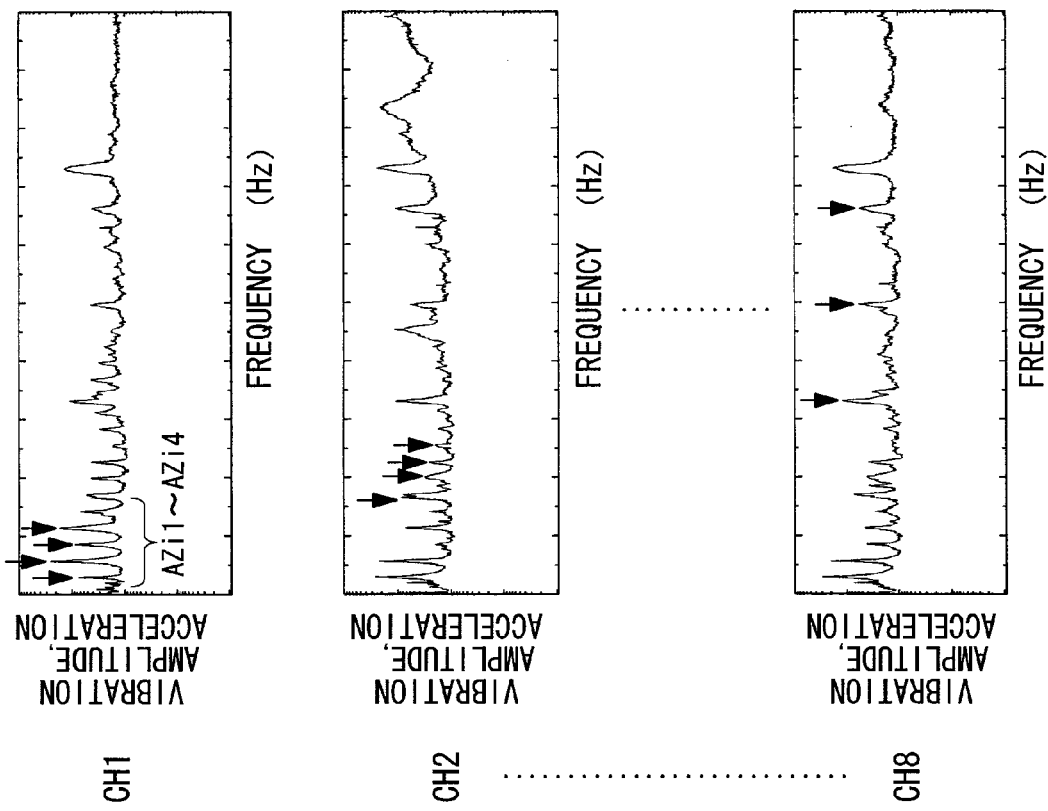
FIG. 4 is a diagram for explaining processing for calculating diagnostic physical quantities from measurement data acquired by respective acceleration sensors in an example case where diagnosis of a bearing/gearbox is performed.

In diagnosing a fault in a certain transmission stage of a gearbox in a bearing/gearbox, the vibration acceleration at the meshing frequency (eigenvalue) of a plurality of cogs constituting that transmission stage is calculated, and diagnosis of a certain transmission stage is performed using this vibration acceleration. Therefore, the data generator 22 performs signal processing for frequency transforming (one example is a Fast Fourier Transform) the respective time-series waveforms measured via eight channels CH1 to CH8 to obtain frequency spectra, as shown in FIG. 4, and vibration amplitude accelerations at a plurality of natural frequencies shown by the arrows in FIG. 4 are extracted from these frequency spectra. Then, a new data file is created by storing the extracted vibration amplitude accelerations in a file identified by each channel and natural frequency.

FIG. 5 shows an example of the newly created data file. As shown in FIG. 5, the channels (sensors), which are represented by CH1, CH2, etc., are associated with the natural frequencies, which are represented by "AZi1", "AZi2", "AZi3", etc., and the vibration accelerations at each measurement timestamp are stored as the diagnostic physical quantities. The measurement timestamp for each diagnostic acceleration is standardized with the measurement timestamps of the other data files, as mentioned above.

Thus, in a prescribed data file, the diagnostic physical quantities are calculated, and a new database is created.

The calculation of the above-described diagnostic physical quantities is performed for the measurement data measured by the sensors mounted to various monitoring locations in order to diagnose the operating status of the wind turbine 1. Which measurement data in the data file, which signal processing to perform, and which diagnostic physical quantity to calculate are registered in advance in the data generator 22.

Various data files whose sampling times are standardized by the data generator 22 and the newly created data file for the diagnostic physical quantities are output to the class categorizing unit 24. Note that, subsequent processing is not especially needed for the raw data files used in calculating the diagnostic physical quantities, and therefore, they are not output to the class categorizing unit 24.

The class categorizing unit 24 first creates a single diagnostic data file by combining the various data files input from the data generator 22.

FIG. 6 shows an example of the diagnostic data file. As shown in FIG. 6, the measurement data or the diagnostic physical quantities at each measurement timestamp are associated with each other, categorized by sensor. In this embodiment, headings such as "normalized wind speed", "MET wind speed turbulence", "net output power", "AZi1", "AZi2" etc., which indicate the nature of each measurement data value or diagnostic physical quantity written at the top of the table in FIG. 6, are called "attributes", and each data value of each attribute is defined as an "attribute value".

The attributes are categorized as "environment", "performance", and "characteristic", based on the nature thereof. Attributes related to the environment surrounding the wind turbine, such as "wind speed" and "wind speed turbulence", are categorized as "environment"; attributes related to the performance and electricity generating conditions of the wind turbine operation, such as the electricity generating conditions, the rotational speed of the generator, and commands concerned with power generation control, are categorized as "performance"; and attributes related to diagnosis of the operating status of the wind turbine, such as "AZi1", "AZi2", etc., are categorized as "characteristic". Here, the attributes categorized as "characteristic" correspond to the newly created data file in the data generator 22 described above.

In this embodiment, a single diagnostic data file is formed by combining attribute values at one minute intervals from 0:00 to 23:59 on a given day.

Next, in the diagnostic data file, the class categorizing unit 24 adds identifying information for class categorizing each dataset, where the attribute values associated with the same measurement stamp serve as one dataset.

Specifically, on the basis of a class definition defined in the class-category defining unit 23, for each dataset, that is to say, each row in the diagnostic data file shown in FIG. 6, the class categorizing unit 24 distinguishes to which class category the dataset belongs and sets a flag indicating the class category in each dataset.

The term "class category" used here means separation of a data group that matches a reference region of a plurality of attributes, set in the class-category defining unit 23, in a statistical diagnostic method such as the Mahalanobis-Taguchi method (hereinafter called the "MT method"). Thus, statistical diagnosis for identifying normality or a fault with the same "class categories" gives a higher identification precision than in the case of the entire dataset without class categorization.

Figure 7:
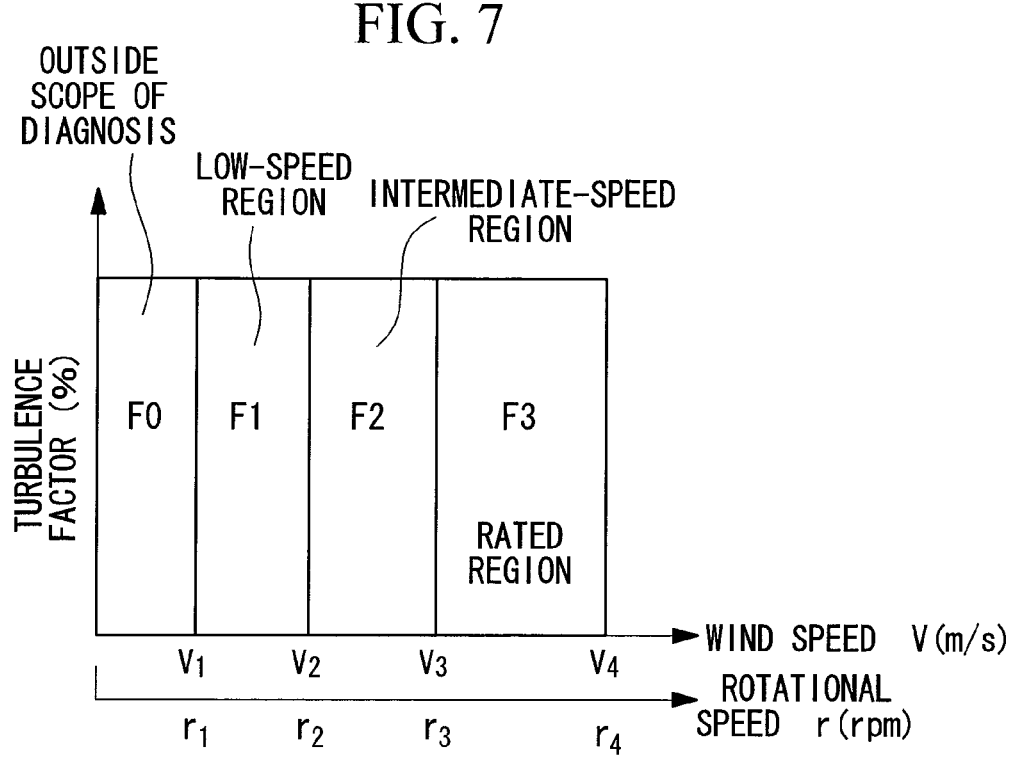
FIG. 7 is a diagram showing an example of class categories.

The "class categories", which is the feature of the present invention, in the wind turbine are explained using the schematic class category diagram in FIG. 7.

In this embodiment, the attribute serving as an index value for class categories is assumed to be "wind speed". "Wind speed" is convenient because it is strongly related to the electricity generating performance of the wind turbine. Here, threshold values (conditions) are set based on physical quantities at each level of "wind speed", and class categories are defined as classes F0, F1, F2, and F3.

In terms of the specific context of wind turbine performance, F0 is a wind speed region where the wind turbine does not contribute to electricity generation, F1 is a low speed region where electricity generation begins, F2 is an intermediate speed region where electricity generation starts to build up, and F3 is a rated region where the rated level of electricity generation begins.

Because class F0 described above is the wind speed region where the wind turbine does not contribute to electricity generation, class F0 is defined as a data group that is outside the scope of the diagnosis, and the three classes F1 to F3 are defined as the target classes for the diagnosis.

Figure 8:
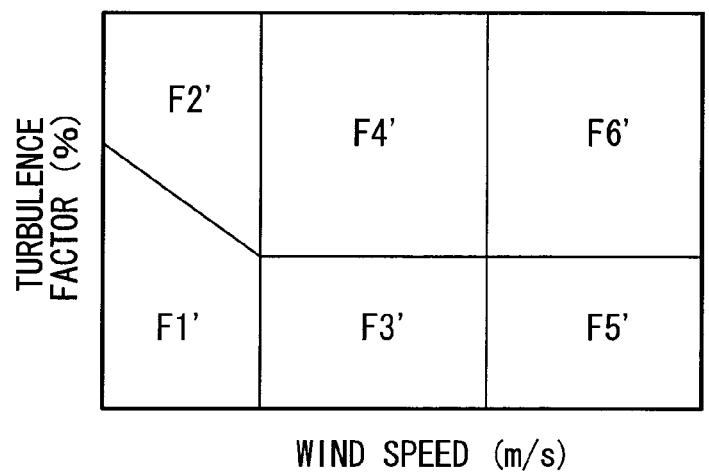
FIG. 8 is a diagram showing another example of class categories.

Instead of the class categories described above, each measurement timestamp may be categorized into a plurality of classes, using the two parameters wind speed and wind speed turbulence factor. FIG. 8 shows a case of categorizing into a total of 6 classes F1' to F6', separated into cases where the wind speed turbulence factor (%) is low and high.

In the above example, class categorizing is performed based on wind speed etc.; however, as shown in FIG. 7, class categorizing may be performed based on "rotational speed", which shows a strong relationship with the electricity generating performance of the wind turbine.

The information defining the class categories as described above is stored in the class-category defining unit 23. Referring to the numerical values for the class category conditions stored in the class-category defining unit 23, the class categorizing unit 24 assigns a class category to each dataset (each row) in the diagnostic data file.

The first storage unit 25 stores the diagnostic data file categorized into classes (flagged) in the class categorizing unit 24. The class-categorized diagnostic data file stored in the first storage unit 25 is treated as "signal space" in the computational processing in the index-value calculating unit 30.

On the other hand, starting with a "prior diagnostic data file" that is already obtained, and via processing in the normal-data extraction unit 27, only the datasets determined as being "normal", according to a conditional expression or definition instruction such as a value in a normality defining unit 26, are extracted from the "prior diagnostic data file" and are stored in the second storage unit 28. This stored data is called "normal data".

Naturally, at this stage, a class category flag in the class categorizing unit 24 at the previous processing stage is added to each dataset in the normal data file stored in the second storage unit 28.

The normal data file stored in the second storage unit 28 is characterized in that it is automatically created by the normal-data extraction unit 27, and is automatically updated and accumulated every day from the prior normal data file. The processing functions by which the "normal data file" is automatically created from the "diagnostic data file" stored in the first storage unit 25 will be described here using the drawings.

The normal-data extraction unit 27 refers to the normal range (reference range) defined in the normal-data condition defining unit 26, thereby extracting only the datasets in the diagnostic data file matching that definition and transferring them to the second storage unit 28 for storage.

Figure 9:
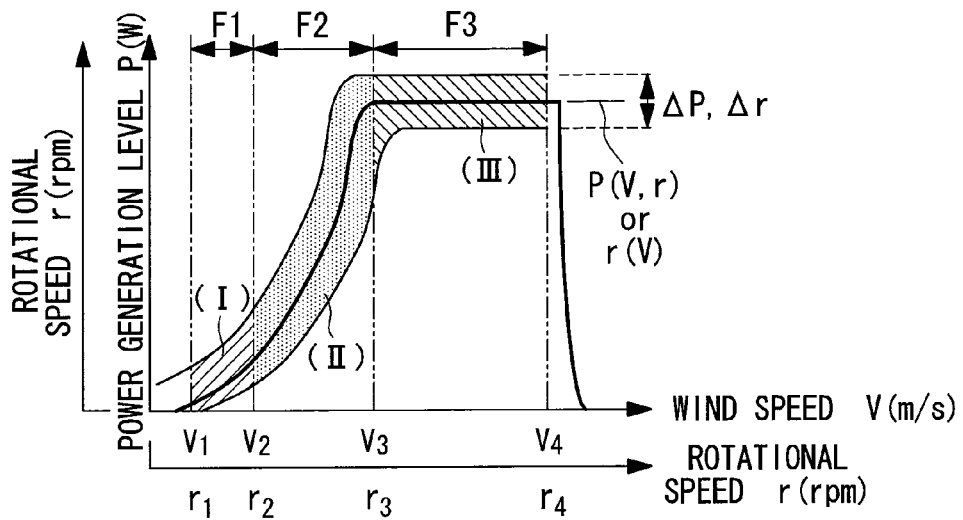
FIG. 9 is a diagram showing an example of normality defining ranges.
Figure 10:
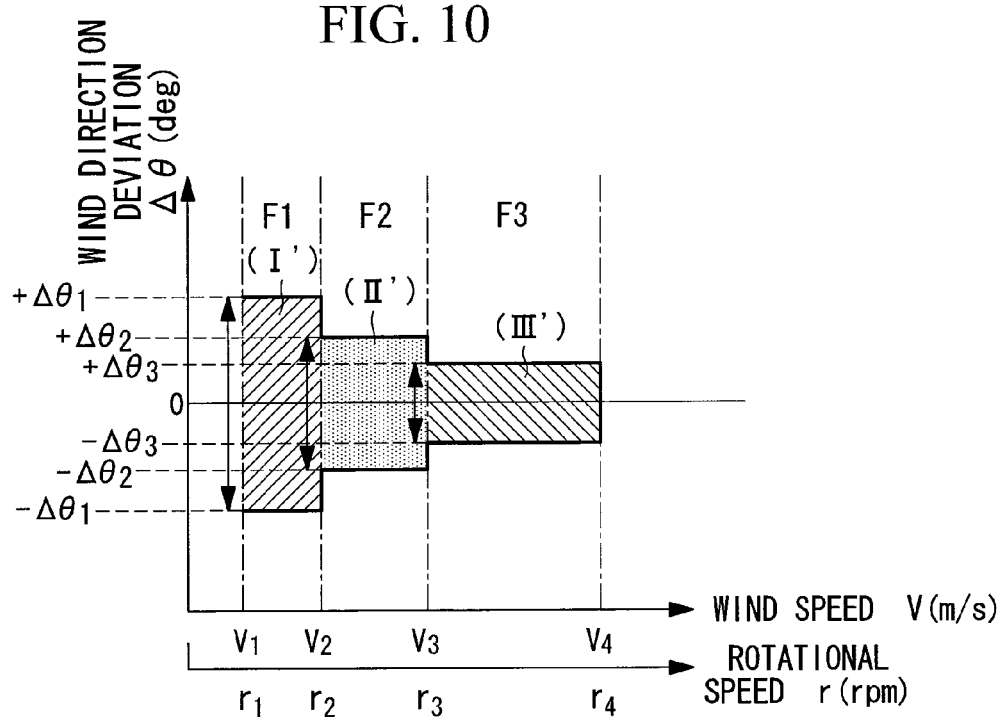
FIG. 10 is a diagram showing another example of normality defining ranges.

Preferable examples of the definition conditions in the normal-data condition defining unit 26 in the present invention are shown in FIGS. 9 to 10.

FIG. 9 shows normality definition based on the general performance under rated ranges of variation of the power generation level.

The horizontal axis in FIG. 9 is wind speed, and the vertical axis is the power generation level P. The performance curve of the power generation level can be expressed as a function $P(V,r)$. With regard to the normal range of the power generation level, normal ranges (I), (II), and (III) are defined for each of the class categories F1 to F3 depending on the wind speed, and the condition defining the normal performance range is assumed to be a deviation of $\pm \Delta P/2$ from that performance curve.

Defining $\Delta P$ above as a proportion A (%) of the power generation level, or rotational speed $r_0(V_0)$, at a given wind speed $V_0$ and rotational speed $r_0$ gives $\Delta P = (A/100) \times P_0(V_0, r_0)$.

Note that, in the example above, the vertical axis is taken as the power generation level P; instead of this, however, the rotational speed r may be used. In this case, the performance curve of the rotational speed can be expressed as a function $r(V)$. Regarding the normal range of the rotational speed, normal ranges (I), (II), and (III) are respectively defined for each of the class categories F1 to F3 depending on the wind speed, and the condition defining the normal performance range is assumed to be a deviation of $\pm \Delta r/2$ from that performance curve.

Defining $\Delta r$ above as a proportion A (%) of the power generation level, or rotational speed $r_0(V_0)$, at a given wind speed $V_0$ and rotational speed $r_0$ gives $\Delta r = (A/100) \times r_0(V_0)$.

In the example above, the horizontal axis is taken as wind speed; however, in FIG. 9, the horizontal axis may be taken as rotational speed r, and the vertical axis may be taken as power generation level P. In this case, the above-described normal ranges (I), (II), and (III) are defined for each of the class categories according to the rotational speed.

FIG. 10 shows normality definition based on the general conditions for normal operation under rated ranges of variation of the wind direction deviation.

The horizontal axis in FIG. 10 is wind speed, and the vertical axis is wind direction deviation $\Delta \theta$. The "wind direction deviation" will be described here. Normally, regarding the conditions for "normal" operation of the wind turbine, it is assumed that the wind turbine always receives wind with the rotating plane of the wind turbine blades facing straight ahead relative to the wind direction.

The difference between the actual wind direction and the direction of the rotating plane of the wind turbine blades is called the "wind direction deviation", and the wind direction deviation $\Delta \theta$ in the ideal straight-ahead situation is defined as zero as a standard value. For the normal range of the wind direction deviation $\Delta \theta$ which is one of the conditions for "normal" operation, normal ranges (I'), (II'), and (III') are respectively defined for each of the class categories F1 to F3 depending on the wind speed.

That is, regarding the direction of the wind turbine, the wind is captured while tracking the wind direction, which constantly varies under natural conditions, so as to stay within the ranges (I'), (II'), and (III'), so that power generation is carried out under the ideal operating conditions.

In the example above, the horizontal axis is taken as wind speed V; instead of this, however, the horizontal axis may be taken as rotational speed r. In this case, the above-described normal ranges (I'), (II'), and (III') are defined for each of the class categories according to the rotational speed.

It is arranged so that the user can freely set combinations of logical expressions (AND, OR, NOT) of the above-described normal ranges (I), (II), and (III) and (I'), (II'), and (III') stored in the normal-data condition defining unit 26.

From the diagnostic data file, the normal-data extraction unit 27 extracts only the datasets determined as being in a normal range, according to the definition of the above-described normal ranges stored in the normal-data condition defining unit 26, and stores them in the second storage unit 28; by doing so, only normal data is stored in the second storage unit 28. These normal data files stored in the second storage unit 28 are treated as "unit space" in the computational processing in the index-value calculating unit 30.

The diagnostics setting unit 29 extracts all or some of the datasets from the diagnostic data file in the first storage unit 25 and creates a "diagnostic data file" (signal space) for diagnosis; in addition, it also extracts all or some of the datasets from the normal data file in the second storage unit 28 and creates a "reference data file" (unit space) for diagnosis.

The class category flag, as described above, is added to each dataset in the "diagnostic data file" and "reference data file". Details will be given below; basically, however, in the MT method, fault diagnosis is carried out by comparing the "reference data file" and the "diagnostic data file" for the same class categories. In addition, for diagnostic purposes, it is also possible to carry out comparative fault diagnosis between different classes, or comparative fault diagnosis by reconstructing classes with a plurality of classes as a whole serving as a single group.

The index-value calculating unit 30 calculates a status index value indicating the soundness of the bearing/gearbox in the wind turbine 1 by using a statistical diagnostic method based on the "diagnostic data file" and the "reference data file" created by the diagnostics setting unit 29. Specifically, the index-value calculating unit 30 normalizes the "diagnostic data file" and the "reference data file" created by the diagnostics setting unit 29, obtains the distribution of each item in the normalized "diagnostic data file" and the "reference data file", quantitatively determines the state of mutual divergence of the data distributions (groups) as the distance between the distributions, and treats this distance as the status index value of the soundness.

More specifically, in the statistical diagnostic method in the index-value calculating unit 30, using the MT method, the Mahalanobis distance (hereinafter called "MD value") is calculated as the status index value of the soundness, which is one of the diagnosis output results obtained by the MT method. A concrete calculation method will be described later.

The fault determining unit 31 compares the status index value calculated by the index-value calculating unit 30 with a threshold value set in advance, and evaluates the status of the wind turbine 1 according to the result of this comparison. For example, if the status index value exceeds the threshold, the status is determined as being faulty, and a fault determination signal is output to the notification unit 32.

The notification unit 32, upon receiving the fault determination signal, shows the occurrence of a fault in the wind turbine 1 on a display or the like, thereby notifying the user of the occurrence of a fault. Instead of or in addition to visual notification, a fault may be notified audibly, for example, by means of an alarm. Thus, the notification method is not particularly limited.

Next, the processing executed in each unit provided in the monitoring device 10 according to this embodiment will be described in detail with reference to FIG. 11. The various processes described below, which are implemented by each unit shown in FIG. 3, are realized by the CPU 11 shown in FIG. 2 reading out a monitoring program stored in the auxiliary storage device 13 into the main storage device 12 and executing it.

This embodiment assumes a case where the status of the bearing/gearbox (monitored part) in the nacelle 3, one of the parts constituting the wind turbine 1, is monitored.

First, in the monitoring device 10, the measurement data measured by the eight acceleration sensors attached to the bearing/gearbox of the wind turbine 1, which is the part to be monitored, as well as the measurement data measured by various sensors provided at prescribed locations, for example, wind speed, wind direction, generator rotational speed, temperature, etc., are associated with time information and are sequentially transmitted via communication circuits. These measurement data are sequentially accumulated in the measurement-information storage unit 21 by sensor type.

Figure 11:
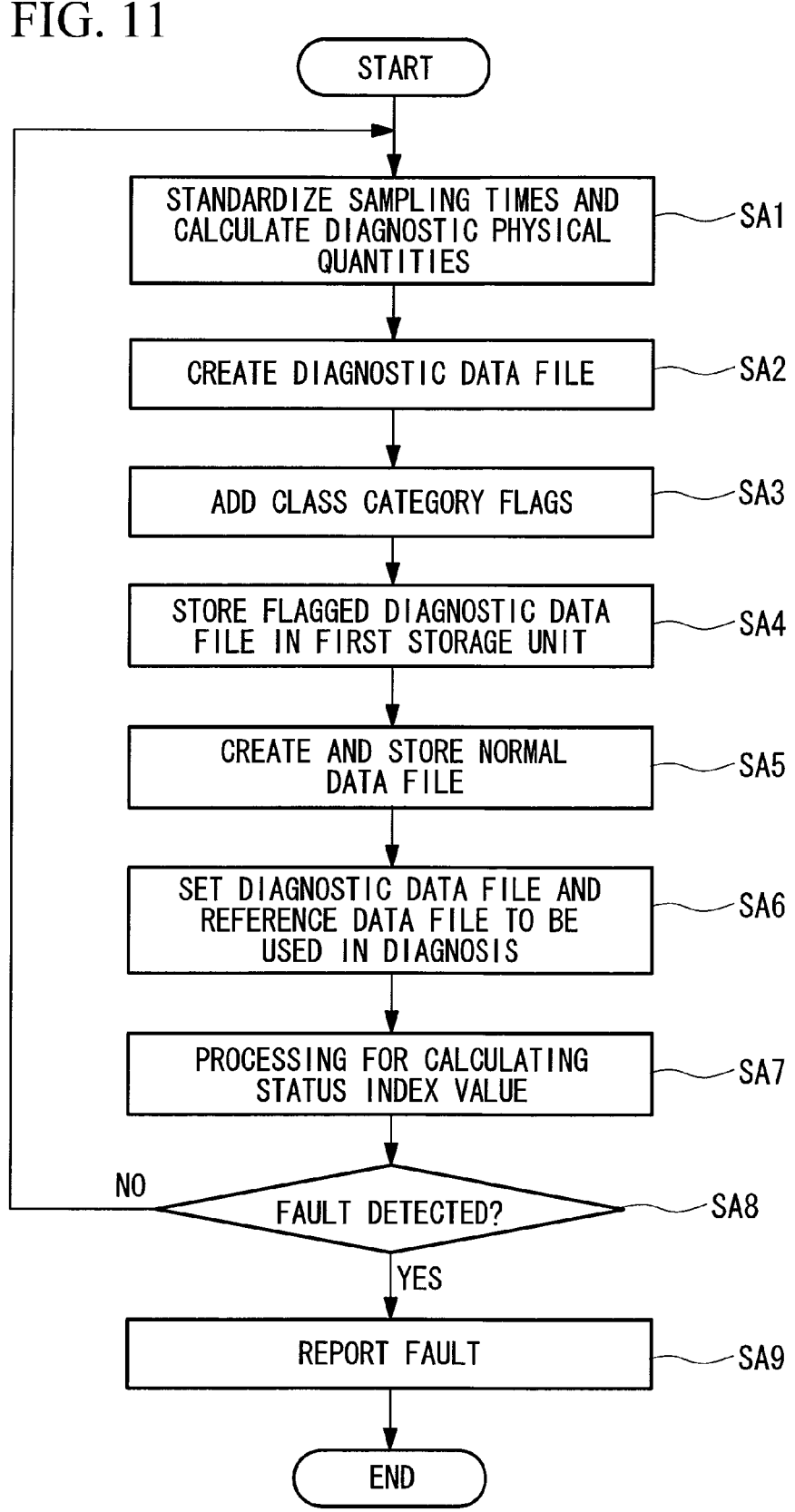
FIG. 11 is a flow chart showing a processing sequence in the first embodiment of the present invention.

The data generator 22 standardizes the sampling times of the measurement data sequentially stored in the measurement-information storage unit 21, calculates diagnostic physical quantities from the measurement data for the eight sensors attached to the bearing/gearbox, which is the part being monitored, and creates a data file for each natural frequency (step SA1 in FIG. 11).

Next, the individual data files are combined by the class categorizing unit 24 to create the diagnostic data file (step SA2 in FIG. 11), and a flag indicating the class category is added to each dataset associated with the same measurement timestamp in this diagnostic data file (step SA3 in FIG. 11). The diagnostic data file to which the class category flags are added is stored in the first storage unit 25 (step SA4 in FIG. 11).

Next, from the class-categorized diagnostic data file stored in the first storage unit 25, only normal datasets are extracted by the normal-data extraction unit 27, generating a normal data file, which is stored in the second storage unit 28 (step SA5 in FIG. 11).

Next, all or some of the datasets in the diagnostic data file in the first storage unit 25 are extracted by the diagnostics setting unit 29, creating a diagnostic data file for diagnosis, and all or some of the datasets in the normal data file in the second storage unit 28 are extracted and set as a normal data file for diagnosis (hereinafter called "reference data file") (step SA6 in FIG. 11).

Once the "diagnostic data file" and the "reference data file" are set in this way, processing for calculating the status index value of the soundness is performed by the index-value calculating unit 30 (step SA7 in FIG. 11).

The processing for calculating the status index value will be described below with reference to FIG. 12.

Data Normalization

Figure 12:
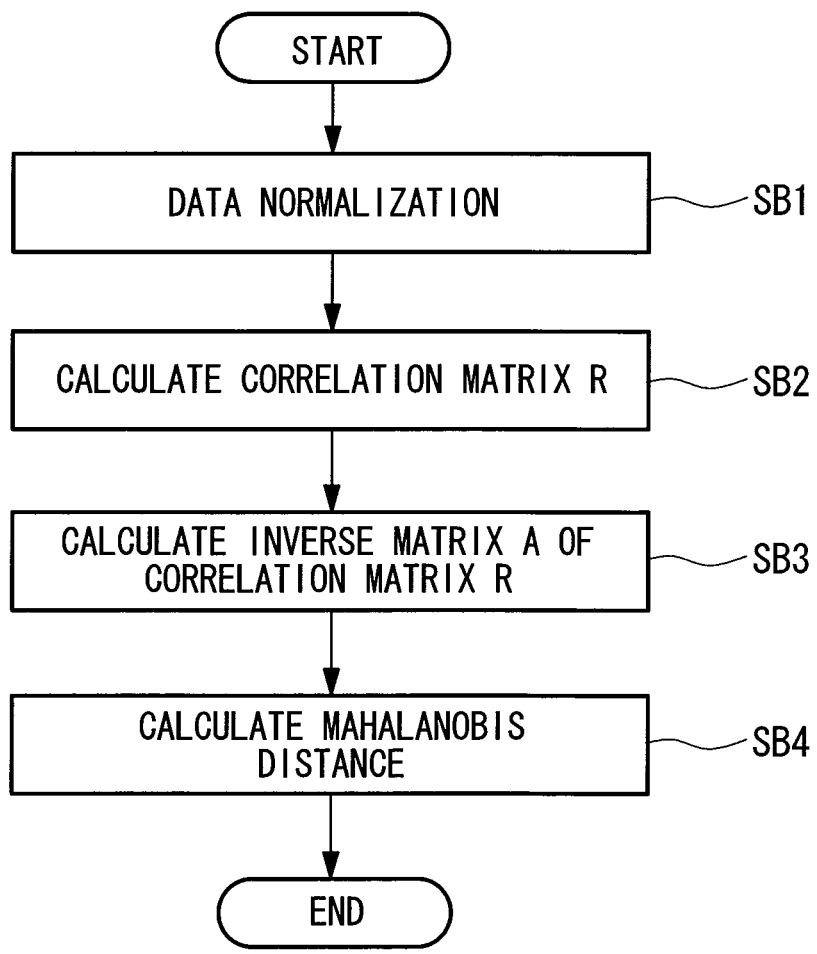
FIG. 12 is a flow chart showing a processing sequence for calculating a status index value.

First, the index-value calculating unit 30 executes data normalization processing (step SB1 in FIG. 12).

For example, if the number of measurement timestamps of the reference data file set in the diagnostics setting unit 29 is i, and the number of attributes is j, the reference data file forms a matrix with i rows and j columns. For instance, for the number of data points at one minute intervals in one day, the data size is 1440 rows, that is, 24 hours×60 minutes=1440 minutes, and 200 columns, if there are 200 kinds of measured data items.

The reason for normalizing the reference data is so as to equally treat the attribute values between different attributes (between measured physical quantities) in the statistical processing. Therefore, processing is performed for normalizing the attribute values $x_{ij}$ identified by each row and each column by using a mean $m_j$ and standard deviation $\sigma_j$ calculated based on equations (1) and (2) below. The value of the attribute value after normalization is represented by a characteristic normalized value $X_{ij}$, which is given by equation (3) below.

In the following, a description is given assuming that each data file has n rows and k columns, as shown in FIG. 13.

[FORMULA 1]

$$m_j = \frac{\sum_{i=1}^{n} x_{ij}}{n} \quad (1)$$

$$\sigma_j = \sqrt{\frac{1}{n}\left[\sum_{i=1}^{n}(x_{ij} - m_{ij})^2\right]} \quad (2)$$

$$X_{ij} = \frac{x_{ij} - m_j}{\sigma_j} \quad (3)$$

Similarly, the index-value calculating unit 30 also normalizes the "diagnostic data file" by performing the same calculation as for the reference data file. Regarding the mean $m_j$ and standard deviation $\sigma_j$ used for normalization, values in the "reference data file", which are calculated with equations (1) and (2) above, are used. As a result, a characteristic normalized value $Y_{ij}$ obtained by normalizing each attribute value $y_{ij}$ in the "diagnostic data file" is calculated from equation (4) below.

[FORMULA 2]

$$Y_{ij} = \frac{y_{ij} - m_j}{\sigma_j} \quad (4)$$

The index-value calculating unit 30 reconstructs the respective data files by replacing each attribute value in the "reference data file" and the "diagnostic data file" with the characteristic normalized values obtained after the normalization.

Calculation of Correlation Matrix

Next, the index-value calculating unit 30 calculates a correlation matrix $R=(r_{ij})$ using the characteristic normalized values $X_{ij}$ in the reference data file (step SB2 in FIG. 12). The correlation matrix is derived using equation (5) below. The correlation matrix is a k-th order matrix whose diagonal elements are 1.

[FORMULA 3]

$$R = [r_{ij}] = \left[\frac{\sum_{p=1}^{k} X_{pj} \cdot X_{ip}}{k}\right] = \begin{bmatrix} 1 & r_{12} & \cdots & r_{1k} \\ r_{k1} & 1 & & r_{2k} \\ \vdots & & \vdots & \vdots \\ \vdots & & & \vdots \\ r_{k1} & \cdots & \cdots & 1 \end{bmatrix} \quad (5)$$

A more concrete explanation for obtaining the correlation matrix will be given here. When the number of types of attributes j of the characteristic normalized values $X_{ij}$ in the reference data file is k (k columns), the number of correlation combinations thereof is k×k. As one example, if there are k=200 types (columns) of attributes j in the reference data file, the number of correlation combinations thereof is 200×200=40000, which at the same time is a characteristic of a 200×200 regular matrix. Because the diagonal elements of the regular matrix are the correlation between the same attributes, naturally they have the property that they are 1. Also, the correlation coefficients of off-diagonal elements are $r_{pq}=r_{qp}$; that is, the values thereof are symmetrically identical on either side of the diagonal.

Calculation of Inverse Matrix of Correlation Matrix

Next, the index-value calculating unit 30 calculates the inverse matrix $A=R^{-1}$ of the correlation matrix R of the reference data file, using equation (6) below (step SB3 in FIG. 12).

[FORMULA 4]

$$A = R^{-1} = \begin{bmatrix} a_{11} & a_{21} & \cdots & a_{n1} \\ a_{12} & a_{22} & \cdots & \cdots \\ \cdots & \cdots & \cdots & \cdots \\ a_{1n} & \cdots & \cdots & a_{nn} \end{bmatrix} = \begin{bmatrix} 1 & r_{12} & \cdots & r_{1k} \\ r_{21} & 1 & & r_{2k} \\ \vdots & & \vdots & \vdots \\ \vdots & & & \vdots \\ r_{k1} & \cdots & \cdots & 1 \end{bmatrix}^{-1} \quad (6)$$

Calculation of Mahalanobis Distance

Next, the Mahalanobis distance $D^2_i$ (hereinafter referred to as "MD value") is obtained using the inverse correlation matrix A of the reference data file obtained using equation (6) above and each characteristic normalized value $Y_{ij}$ of the normalized diagnostic data file (step SB4 in FIG. 12). The MD value $D^2_i$ is calculated using equation (7) below.

Here, k is the number of attributes in the "diagnostic data file", that is, the number of columns, and the MD value is calculated for each dataset (each row) in the "diagnostic data file". For example, assuming that the "diagnostic data file" is a data file for a one-day period acquired at one-minute intervals, the number of rows is 1440, and thus 1440 MD values are obtained. This means that, the MD values, which are the diagnostic indicators of the soundness of the bearing/gearbox, are sequentially calculated for each measurement timestamp.

[FORMULA 4]

$$D^2_i = \frac{1}{k} [\, Y_{i1} \;\; Y_{i2} \;\; \cdots \;\; Y_{ik} \,] \times \begin{bmatrix} a_{11} & a_{21} & \cdots & a_{k1} \\ a_{12} & a_{22} & \cdots & \cdots \\ \cdots & \cdots & \cdots & \cdots \\ a_{1k} & \cdots & \cdots & a_{kk} \end{bmatrix} \times \begin{bmatrix} Y_{i1} \\ Y_{i2} \\ \vdots \\ Y_{ik} \end{bmatrix} \quad (7)$$

When the MD value for a given measurement timestamp is calculated, the i-th data row (i is any value from 1 to n) corresponding to the given measurement timestamp in the normalized "diagnostic data file" is specified, and $Y_{i1}$ to $Y_{ik}$, which are the values in each column for that row i, are substituted into equation (7) and calculated. In the example in FIG. 6, when obtaining the MD value at the measurement timestamp 0:03, the characteristic normalized values $Y_{44}$ to $Y_{4k}$ for k columns in the (i=4)-th data row are used. Thus, MD values corresponding in number to the number of measurement timestamps in the "diagnostic data file" are obtained.

The point to be noted here is that, in steps SB1 to SB4, it is essential to use the proper $m_j$ and $\sigma_j$ for normalization and the proper inverse correlation matrix A when calculating the MD values, depending on which class category of the dataset in the reference data file is compared with the dataset in the diagnostic file; however, they can be automatically calculated in advance by programming instructions.

The status index value calculated by the index-value calculating unit 30 is output to the fault determining unit 31. The fault determining unit 31 compares each input MD value $D^2_i$ with a threshold value that is set in advance (any value may be set, for example 3) and determines whether the MD value $D^2_i$ is greater than the threshold value (step SA8 in FIG. 11). If, as a result, MD values $D^2_i$ greater than the threshold value exist at a prescribed ratio or above, the status of the wind turbine 1 is assumed to be faulty, and the fault signal is output. Accordingly, the fault in the wind turbine 1 is reported to the user by the notification unit 32 (step SA9 in FIG. 11).

On the other hand, if the MD values $D^2_i$ exceeding the threshold value are at or below the prescribed ratio, the status of the wind turbine 1 is assumed to be normal, the process returns to step SA1 in FIG. 11, and the above-described processing from step SA1 is repeated. Accordingly, unless a fault is detected, the above-described processing from step SA1 to step SA8 is repeatedly executed, and the status monitoring of the wind turbine 1 is performed at prescribed intervals.

Figure 14:
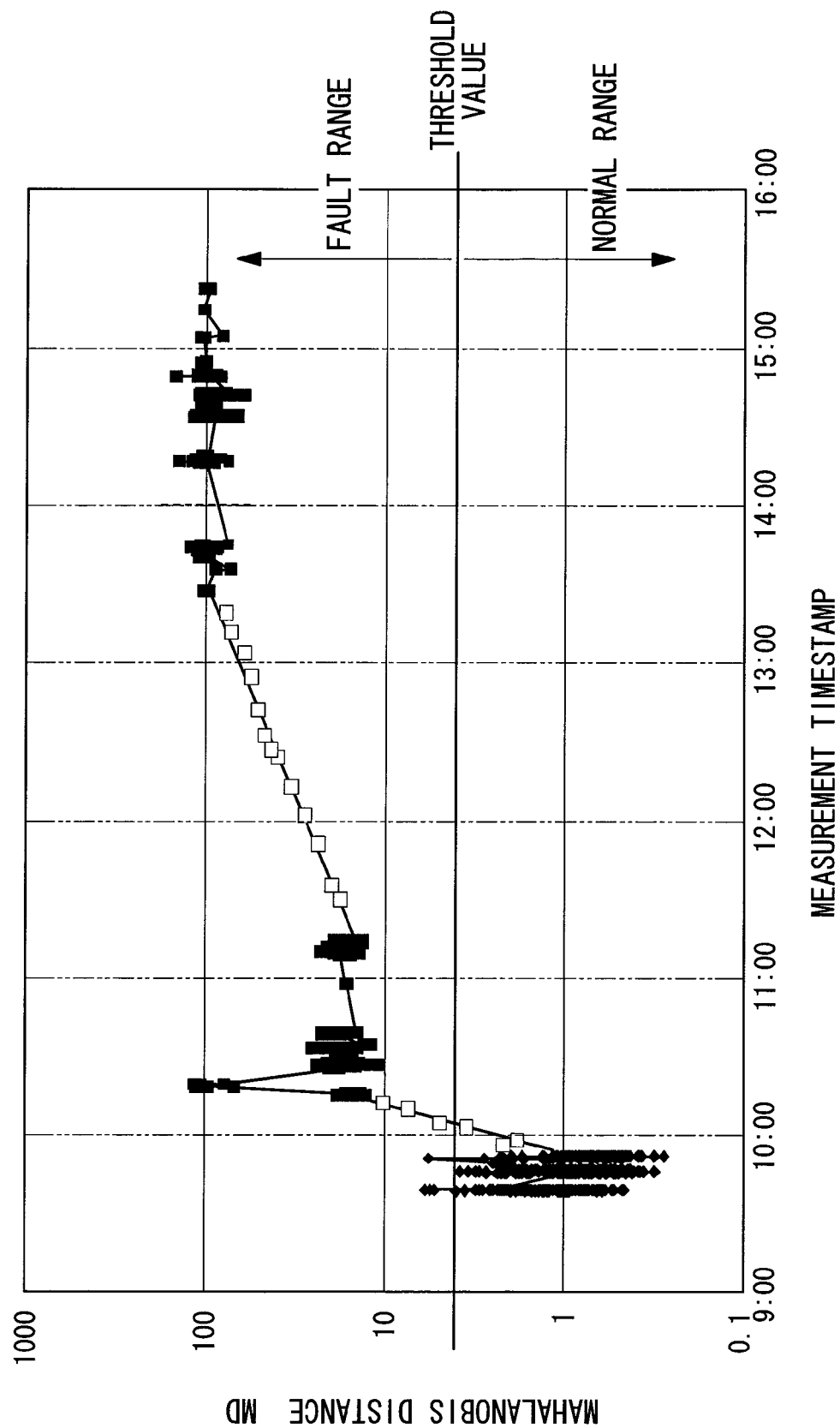
FIG. 14 is a diagram showing an example of the results of evaluating the status index value.

The status index value calculated by the index-value calculating unit 30 is displayed on the display device as a diagnosis result, as shown in FIG. 14. FIG. 14 is a diagram showing an example of the diagnosis results. The measurement timestamp is shown on the horizontal axis, and the MD value is shown on the vertical axis.

As described above, with the wind turbine monitoring device, method, and program according to this embodiment, it is possible to quantitatively determine the soundness of the wind turbine using MD values by performing a comparison with the "reference data file", which contains the class-categorized actual measured values; therefore, it is possible to realize proper evaluation instead of a qualitative evaluation based on experience or knowledge.

In the embodiment described above, the normal data stored in the second storage unit 28 is created using the data stored in the first storage unit 25; however, the normal data stored in the second storage unit 28 is not limited to this example. For instance, normal data that is calculated by certain simulation software or the like may be used.

In the embodiment described above, a description is given in which the processing from step SA1 to step SA9 is assumed to be a single processing sequence, as shown in FIG. 11. However, the processing for creating the normal data file, that is to say, the processing for storing the data in the first storage unit 25 and the processing for storing the data in the second storage unit 28, may be treated as preprocessing that is necessary for monitoring the status of the wind turbine, and the processing from after setting the reference data file and the diagnostic data file, more specifically, the processing from step SA6 to step SA9 in FIG. 11, may be treated as the main processing for evaluating the status of the wind turbine 1. Then, there may be a time difference between the preprocessing and the main processing, or they may be implemented by different computers.

Second Embodiment

Next a second embodiment of the present invention will be described with reference to the drawings.

In the monitoring device of the wind turbine 1 according to the first embodiment described above, a description is given of a case where a gearbox of the wind turbine is monitored. In this embodiment, however, a description is given of a case where the load applied to the entire wind turbine structure, as well as its strength, is monitored.

Generally a wind turbine receives wind with its wind turbine blades, the wind turbine blades rotate to produce mechanical energy, and this mechanical energy is converted to electrical energy; during this process, however, a load is exerted on the wind turbine structure by the wind, etc. In preliminary design, a strength sufficient to satisfy the maximum permitted load of each structural component is ensured; however, strength deterioration advances due to wind and rain, corrosion, aging etc.

Hence, in this embodiment, distortion changes in the wind turbine 1 are measured with electrical distortion gauges or optical fibers, and the status related to the soundness of the wind turbine 1 (cumulative load, or the degree of strength deterioration) is monitored based on this measured data. The individual processing steps according to this embodiment are the same as the processing steps carried out in the first embodiment described above; only the attributes categorized as "characteristics" are changed. Therefore, a description of each processing step will be omitted.

Thus, for the attributes according to the first embodiment described above, the MD values are calculated by using the measurement data measured by the distortion sensors attached to prescribed locations on the wind turbine 1, and these are compared with the normal data. Accordingly, it is possible to evaluate the soundness of the wind turbine using the MD values, which are objective statistical index values.

In the first or second embodiment described above, a description has been given taking as an example the case where single monitoring sites are monitored; however, the monitoring device of the present invention can also be applied to the case where a plurality of monitoring sites are set.

In this case, in the diagnostic data file shown in FIG. 6, the number of attributes classified as "characteristic" increases according to the number of monitoring sites.

Then, in the calculation of the MD value described above, the statuses of the plurality of monitored sites are combined, and a single type of MD value is calculated as the index value of the soundness of the wind turbine.

Third Embodiment

Next, a monitoring device according to a third embodiment of the present invention will be described.

In the monitoring devices according to the first or second embodiment described above, when a fault is detected by the fault determining unit 31, the need for quantitatively identifying which attribute is involved, or not involved, with that fault status arises. This embodiment is proposed in light of such a requirement.

Figure 15:
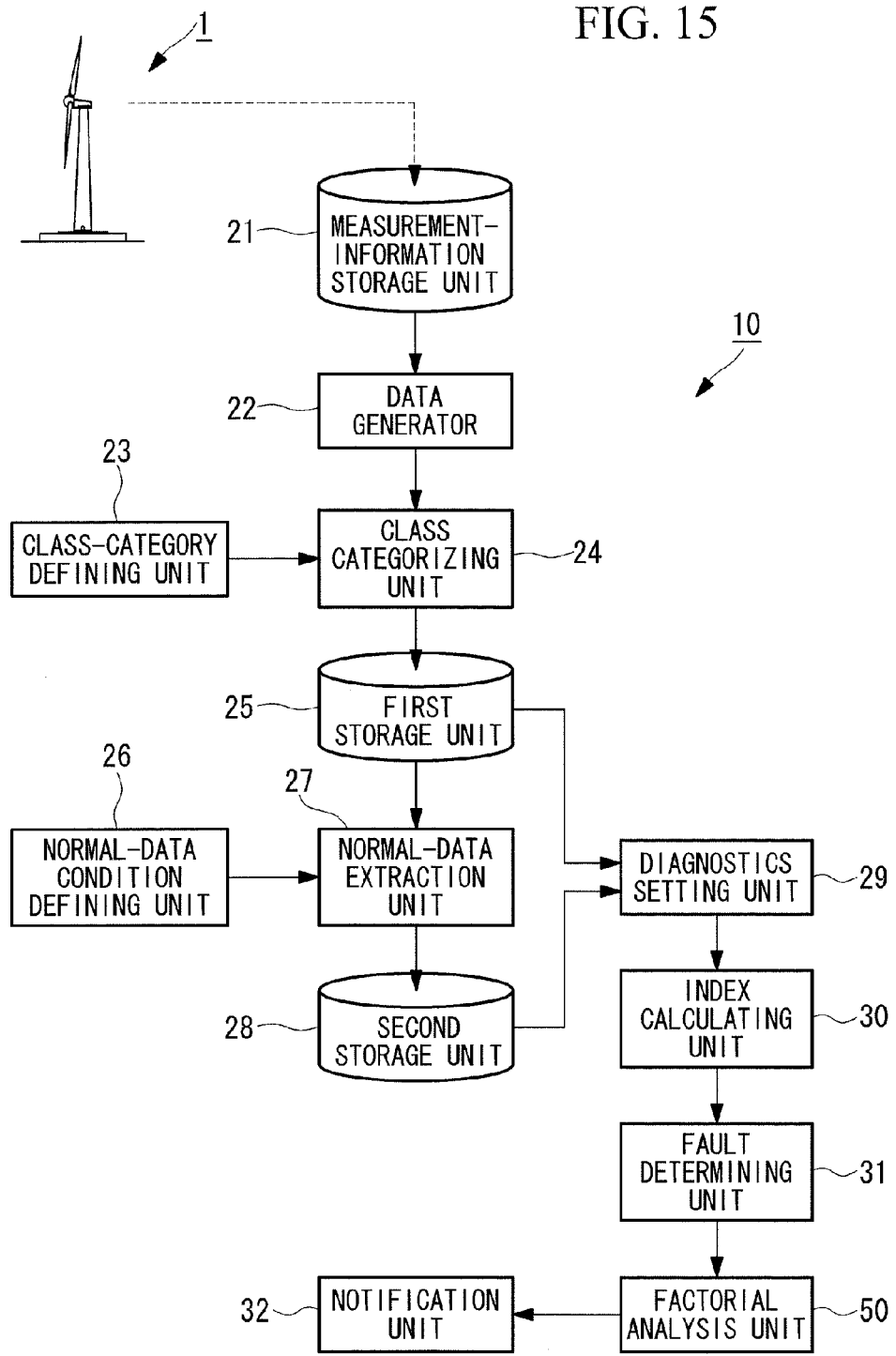
FIG. 15 is a functional block diagram showing, in an expanded fashion, the functions of a monitoring device according to a third embodiment of the present invention.

In this embodiment, as shown in FIG. 15, when a fault is determined by the fault determining unit 31, a factorial analysis unit 50 that performs factorial analysis of that fault is further provided in the monitoring device according to the first or second embodiment described above. In the following, regarding the monitoring device of this embodiment, a description of features in common with those of the first embodiment will be omitted, and the difference, that is, "factorial effect analysis", will be mainly described.

Figure 16:
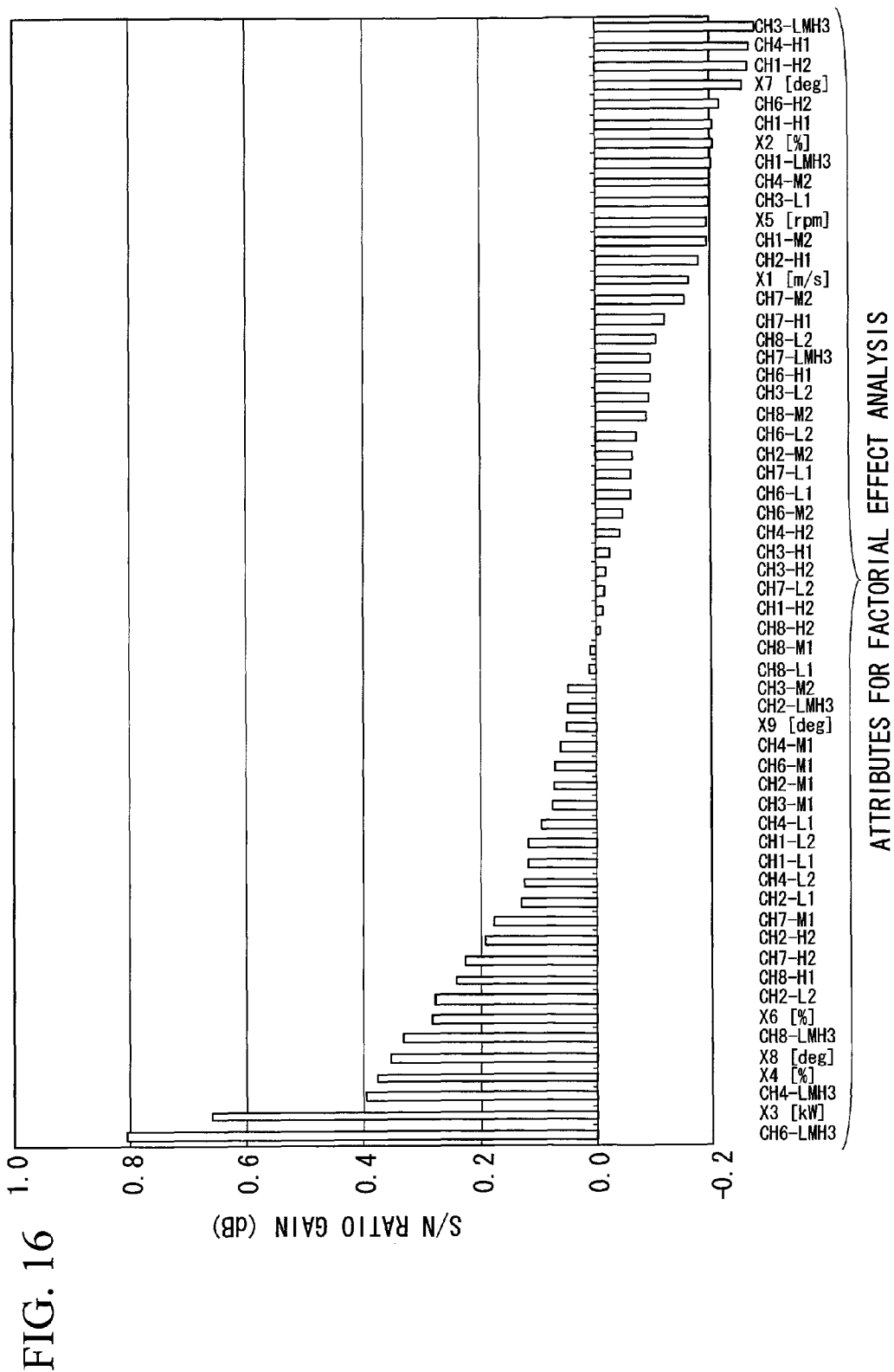
FIG. 16 is a diagram showing an example of factorial analysis results.

"Factorial effect analysis" in this embodiment means, for example, assuming that there are 200 attributes constituting the diagnostic data, quantitatively analyzing which of those attributes have an influence on the size of the MD value, and displaying the attributes in ascending rank as the level of S/N ratio gain, which is a value output from the factorial effect analysis, as shown in FIG. 16.

The method of calculating the S/N ratio gain of each attribute, which is a factorial effect index value, will be explained using FIG. 17. For convenience of explanation, an example will be given of a case where there are 5 kinds of attributes in FIG. 17. The 5 kinds of attributes are each laid out in a two-level orthogonal array with "used, O" and "unused, x", processing for calculating the MD values with the respective conditions is performed according to the 12 combination conditions (row No. in the orthogonal array) of "used, O" and "unused, x" for the five kinds of attributes, and the MD value of each dataset in the diagnostic data file formed of five attributes is calculated.

For example, if the measurement timestamp section in the diagnostic data file determined as being a fault by the fault determining unit 31 lasts for 2 minutes (two data rows), for each row, the MD values are separately calculated for the cases "used, O" and "unused, x" for the 12 sets of attributes. As a result, 12 sets×2 MD values, $D^2(1)$ and $D'^2(2)$, are added to the right side of the orthogonal array in FIG. 18 as calculation results. From these MD values $D^2(1)$ and $D^2(2)$, the S/N ratio $\eta$ for the twelve combinations is calculated using equation (8) below.

[FORMULA 6]

$$\eta_i = -10\log\left[\frac{1}{n}\sum_{i=1}^{n=2}\frac{1}{D_i^2}\right] \tag{8}$$

Here, n is the number of datasets subjected to factorial effect analysis (number of rows); in this example, n=2.

The results of the twelve S/N ratios $\eta_1$ to $\eta_{12}$ calculated in equation (8) are added to the right side of the orthogonal array. Thus, everything is ready for calculating the S/N ratio gain for each of the attributes for the factorial effect (attribute 1 to attribute 5).

Specifically, considering the attributes of the wind turbine 1, the following assignments are possible: for example, "attribute 1=low-speed stage meshing first-order", "attribute=intermediate-speed stage overall value", "attribute=wind speed turbulence", "attribute=wind direction deviation", "attribute=wind turbine blade central deformation value", etc.

Calculation of the above-described S/N ratio and factorial analysis using the S/N ratio, performed by the factor analysis unit 50, will be described in detail below.

[Calculation of S/N Ratio]

As represented by the following equation, the S/N ratio gains $\eta_{c1}$ to $\eta_{c5}$ of attributes 1 to 5, which are obtained by factorial effect analysis in the fault-diagnosis data file, are the differences between the S/N ratios for the combinations in which those attributes are used (O) and the S/N ratios for the combinations in which they are not used (X).

[FORMULA 7]

ATTRIBUTE 1: $\eta_{c1}=\eta_{c1}(O)-\eta_{c1}(x)$

ATTRIBUTE 2: $\eta_{c2}=\eta_{c2}(O)-\eta_{c2}(x)$

ATTRIBUTE 3: $\eta_{c3}=\eta_{c3}(O)-\eta_{c3}(x)$

ATTRIBUTE 4: $\eta_{c4}=\eta_{c4}(O)-\eta_{c4}(x)$

ATTRIBUTE 5: $\eta_{c5}=\eta_{c5}(O)-\eta_{c5}(x)$     (9)

Accordingly, it is possible to determine that the larger the S/N ratio gain is, the higher the likelihood of the attribute value being related to a fault. For the values of $\eta_c(O,x)$ substituted into the above equations, the respective mean values of the S/N ratio values listed in the supplementary table in FIG. 18 are used, using the calculated values in the orthogonal array in FIG. 17.

[Factorial Analysis]

The factorial analysis unit 50 quantifies the factorial effect contribution ratio for each of the attributes based on the gains in equation (9), thereby selecting attributes having a high likelihood of contributing to fault factors from among the plurality of attributes in the diagnostic data file, and outputs this factorial effect result to the notification unit 32. Accordingly, the analysis results of the factorial analysis unit 50 are notified to the user by the notification unit 32.

FIG. 16 is a diagram showing an example of the display screen showing the factorial analysis results. It is shown that attributes exhibiting larger gain values are more likely to be factors in the fault occurrence detected in this analysis.

As described above, with the monitoring device according to this embodiment, when a fault is detected in the wind turbine status, attributes having a high likelihood of being factors in that fault can be analyzed, and the analysis results can be reported to the user. Accordingly, it is possible to quickly take appropriate measures against the fault occurrence.

Note that the factorial analysis results obtained by the above-described factorial analysis unit 50 may be used in maintenance or aftercare service, or the like. By making secondary use of the factorial analysis results in this way, it is possible to discover prognostic indicators of faults, and therefore, it is possible to prevent the occurrence of a serious fault, such as equipment replacement. Thus, it is possible to prevent a drop in operating efficiency of the wind turbine due to fault occurrence, and it is also possible to reduce upkeep costs.

Fourth Embodiment

Next, a wind turbine monitoring device according to a fourth embodiment of the present invention will be described.

In each of the embodiments described above, the normal data file is used as the reference data file. Instead, in this embodiment, the above-described MD value is calculated by using a fault data file as the reference data file. Then, when this MD value is less than a prescribed threshold, it is determined that a fault has occurred.

By using the fault data file as the reference data file in this way, it is possible to easily identify which attribute's diagnostic data indicates what kind of fault by, for example, classifying multiple fault/damage statuses in unit space and calculating the MD values, without performing factorial effect analysis as in the third embodiment described above.

Application Example

Next, a monitoring system according to an embodiment of the present invention will be described.

The monitoring device according to each of the embodiments described above performs status monitoring for individual parts of a single wind turbine. The monitoring system according to this embodiment performs status monitoring of some or all wind turbines 1 in a wind farm in which a plurality of wind turbines are installed.

The monitoring system of this embodiment is equipped with monitoring devices according to any of the first to fourth embodiments described above and monitors the status of a plurality of wind turbines to be monitored, on the basis of status index values of the wind turbines obtained by these individual monitoring devices and a plurality of operating performance measures thereof.

Specifically, the monitoring system acquires monitoring result information, such as the above-described status index values, from the individual monitoring devices via a communication network, for instance, a wireless communication network, and also acquires the total output power level output from the wind turbines being monitored, via the network.

Then, using the status index values acquired from the individual monitoring devices as parameters in the MT method, the monitoring system calculates the MD value of these status index values. Then, the statuses of the wind turbines in the wind farm are determined by comparing the MD value with a threshold value that is set in advance.

As described above, by monitoring the operating performance of the wind farm with the statistics of the status index values of wind turbine units, it is possible to determine the wind turbines that show different attribute values from the others, from among the plurality of wind turbines constituting the wind farm. Thus, examining a plurality of wind turbines, by identifying those wind turbines that show different characteristics from the others, rather than identifying faulty wind turbines on the basis of a uniquely set prescribed threshold value, it is possible to comprehensively determine faults in the wind turbines from a wide perspective, looking at various factors. Accordingly, it is possible to increase the wind turbine monitoring precision.

Note that, rather than requiring a plurality of computers, the above-described monitoring system may sequentially perform calculation of the status index values of the plurality of wind turbines in a single computer system, followed by fault determination of all wind turbines using these status index values. In other words, the above-described individual functions of one device may be realized by installing software for implementing the functions described above and executing this software on a CPU.

Although the embodiments of the present invention have been described above with reference to the drawings, the specific configuration is not limited to these embodiments; design modifications etc. that do not depart from the spirit of the present invention are also encompassed.

The invention claimed is:

1. A wind turbine monitoring device for monitoring the status of a wind turbine using attribute values created on the basis of measurement data measured by a plurality of sensors provided on the wind turbine, the wind turbine monitoring device comprising:
   a first storage unit in which a plurality of attribute values that are associated with a measurement timestamp are stored by attribute type, and in which, when the attribute values associated with the same measurement timestamp serve as a single dataset, identifying information indicating a class category that is set according to attribute values of prescribed attributes is assigned to the dataset and stored;
   a second storage unit in which a plurality of attribute values that are associated with a measurement timestamp are stored by attribute type, and in which, when the attribute values associated with the same measurement timestamp serve as a single dataset, identifying information that indicates a class category that is set according to the attribute values of prescribed attributes is assigned to the dataset, and the attribute values of the specific attributes forming the dataset belong to a prescribed standard range that is defined in advance;
   a diagnostics setting unit that extracts and sets a plurality of the datasets to be used in diagnosis from the first storage unit and that extracts and sets a plurality of the datasets to be used in the diagnosis from the second storage unit;
   an index-value calculating unit that calculates status index values representing the status of the wind turbine using a statistical calculation method, based on the datasets in a diagnostic data file and the datasets in a reference data file set by the diagnostics setting unit;
   an evaluation unit that evaluates the status of the wind turbine on the basis of the status index values calculated by the index-value calculating unit; and
   a notification unit that notifies a result of the evaluation by the evaluation unit.

2. A wind turbine monitoring device according to claim 1, wherein the attributes are broadly divided into three categories, which are an environment category related to the environment surrounding the wind turbine, a performance category related to the performance and power generating conditions of the wind turbine operation, and a characteristics category related to diagnosis of the operating status associated with various monitoring sites set on the wind turbine.

3. A wind turbine monitoring device according to claim 2, wherein the class categories are set according to the attribute values of prescribed attributes categorized into at least one of the environment category and the performance category.

4. A wind turbine monitoring device according to claim 1, wherein the plurality of datasets stored in the second storage unit are those in which only the datasets in which the attribute values associated with the specific attributes fall within the standard range set in advance are extracted from among the plurality of datasets created from the plurality of measurement data items collected from the wind turbine.

5. A wind turbine monitoring device according to claim 1, wherein the standard range is set according to the class category.

6. A wind turbine monitoring device according to claim 1, wherein the index-value calculating unit calculates the status index value by obtaining a characteristic distribution of the reference data and obtaining a characteristic distribution of the diagnostic data, which are set by the diagnostics setting unit, and by qualitatively obtaining the distance by which the characteristic distributions deviate from each other.

7. A wind turbine monitoring device according to claim 6, wherein the status index values calculated by the index-value calculating unit are Mahalanobis distances calculated using the Mahalanobis-Taguchi method.

8. A wind turbine monitoring device according to claim 1, wherein factorial analysis unit is provided that, when it is evaluated by the evaluation unit that a fault occurs, performs factorial analysis of that fault.

9. A wind-turbine-group monitoring system for monitoring the status of part or the entirety of a wind farm equipped with a plurality of wind turbines, comprising:
   a wind turbine monitoring device according to claim 1, wherein the status of part or the entirety of the wind farm is monitored on the basis of a status index value of each of the wind turbines, obtained by the wind turbine monitoring device, and the operating performance of part or the entirety of the wind farm.

10. A wind turbine monitoring method which monitors the status of a wind turbine using attribute values created on the basis of measurement data measured by a plurality of sensors provided on the wind turbine, the wind turbine monitoring method comprising:
   creating, by a processor, a diagnostic data file in which a plurality of attribute values associated with a measurement timestamp are stored by attribute type;
   assigning to the dataset, by a processor, identifying information indicating a class category that is set according to the attribute values of prescribed attributes when the attribute values associated with the same measurement timestamp in the diagnostic data file serve as a single dataset;
   creating, by a processor, a reference data file in which attribute values related to specific attributes belong to a prescribed standard range that is defined in advance, and in which the attribute value of each attribute is associated with the measurement timestamp;
   assigning to the dataset, by a processor, identifying information indicating a class category that is set according to attribute values of prescribed attributes when the attribute values associated with the same measurement timestamp in the reference data file serve as a single dataset;
   extracting and setting, by a processor, a plurality of the datasets to be used in diagnosis from the diagnostic data file, and of extracting and setting a plurality of the datasets to be used in the diagnosis from the reference data file;
   calculating, by a processor, status index values representing the status of the wind turbine using a statistical calculation method, based on the set datasets in the diagnostic data file and the datasets in the reference data file;
   evaluating, by a processor, the status of the wind turbine on the basis of the status index values; and
   notifying, by a processor, the result of the evaluation.

11. A non-transitory computer readable medium containing computer instructions stored therein for causing, when executed by a computer processor, the computer processor to monitor the status of a wind turbine using attribute values created on the basis of measurement data measured by a plurality of sensors provided on the wind turbine, by executing:

processing for creating a diagnostic data file in which a plurality of attribute values associated with a measurement timestamp are stored by attribute type;

assigning processing in which, when the attribute values associated with the same measurement timestamp in the diagnostic data file serve as a single dataset, the dataset is assigned identifying information indicating a class category that is set according to the attribute values of prescribed attributes;

processing for creating a reference data file in which attribute values related to specific attributes belong to a prescribed standard range that is defined in advance, and in which the attribute value of each attribute is associated with the measurement timestamp;

assigning processing in which, when the attribute values associated with the same measurement timestamp in the reference data file serve as a single dataset, the dataset is assigned identifying information indicating a class category that is set according to attribute values of prescribed attributes;

processing for extracting and setting a plurality of the datasets to be used in diagnosis from the diagnostic data file, and for extracting and setting a plurality of the datasets to be used in the diagnosis from the reference data file;

processing for calculating status index values representing the status of the wind turbine using a statistical calculation method, based on the set datasets in the diagnostic data file and the datasets in the reference data file;

processing for evaluating the status of the wind turbine on the basis of the status index values; and processing for notifying the result of the evaluation.

* * * * *